(12) United States Patent
Dropps et al.

(10) Patent No.: US 7,573,909 B2
(45) Date of Patent: *Aug. 11, 2009

(54) METHOD AND SYSTEM FOR PROGRAMMABLE DATA DEPENDANT NETWORK ROUTING

(75) Inventors: Frank R Dropps, Maple Grove, MN (US); Ernest G Kohlwey, Eagan, MN (US); Craig M. Verba, Maple Grove, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 635 days.

This patent is subject to a terminal disclaimer.

(21) Appl. No.: 10/894,627

(22) Filed: Jul. 20, 2004

(65) Prior Publication Data

US 2005/0018680 A1     Jan. 27, 2005

Related U.S. Application Data

(60) Provisional application No. 60/503,812, filed on Sep. 19, 2003, provisional application No. 60/537,933, filed on Jan. 21, 2004, provisional application No. 60/488,757, filed on Jul. 21, 2003, provisional application No. 60/532,965, filed on Dec. 29, 2003, provisional application No. 60/504,038, filed on Sep. 19, 2003, provisional application No. 60/495,212, filed on Aug. 14, 2003, provisional application No. 60/495,165, filed on Aug. 14, 2003, provisional application No. 60/503,809, filed on Sep. 19, 2003, provisional application No. 60/505,381, filed on Sep. 23, 2003, provisional application No. 60/505,195, filed on Sep. 23, 2003, provisional application No. 60/557,613, filed on Mar. 30, 2004, provisional application No. 60/505,075, filed on Sep. 23, 2003, provisional application No. 60/504,950, filed on Sep. 19, 2003, provisional application No. 60/532,967, filed on Dec. 29, 2003, provisional application No. 60/532,966, filed on Dec. 29, 2003, provisional application No. 60/550,250, filed on Mar. 4, 2004, provisional application No. 60/569,436, filed on May 7, 2004, provisional application No. 60/572,197, filed on May 18, 2004, provisional application No. 60/532,963, filed on Dec. 29, 2003.

(51) Int. Cl.
*H04J 3/22*     (2006.01)

(52) U.S. Cl. .......................... 370/469; 370/401; 398/45

(58) Field of Classification Search ................ 370/60, 370/216, 252, 321, 352, 401, 469; 709/203, 709/208, 213, 226, 231, 245; 710/36
See application file for complete search history.

(56) References Cited

U.S. PATENT DOCUMENTS

| | | |
|---|---|---|
| 4,081,612 A | 3/1978 | Hafner |
| 4,162,375 A | 7/1979 | Schilichte ..................... 179/15 |
| 4,200,929 A | 4/1980 | Davidjuk et al. |
| 4,258,418 A | 3/1981 | Heath |
| 4,344,132 A | 8/1982 | Dixon et al. |
| 4,382,159 A | 5/1983 | Bowditch |
| 4,425,640 A | 1/1984 | Philip et al. .................... 370/58 |
| 4,546,468 A | 10/1985 | Christmas et al. ............. 370/54 |
| 4,569,043 A | 2/1986 | Simmons et al. .............. 370/63 |
| 4,691,296 A | 9/1987 | Struger |
| 4,716,561 A | 12/1987 | Angell et al. |
| 4,725,835 A | 2/1988 | Schreiner et al. ........ 340/825.83 |
| 4,821,034 A | 4/1989 | Anderson et al. ........... 340/825 |
| 4,860,193 A | 8/1989 | Bentley et al. |
| 4,964,119 A | 10/1990 | Endo et al. |
| 4,980,857 A | 12/1990 | Walter et al. |
| 5,025,370 A | 6/1991 | Koegel et al. |
| 5,051,742 A | 9/1991 | Hullett et al. |
| 5,090,011 A | 2/1992 | Fukuta et al. |
| 5,115,430 A | 5/1992 | Hahne et al. |
| 5,144,622 A | 9/1992 | Takiyasu et al. .......... 370/85.13 |
| 5,258,751 A | 11/1993 | DeLuca et al. |
| 5,260,933 A | 11/1993 | Rouse |
| 5,260,935 A | 11/1993 | Turner |
| 5,280,483 A | 1/1994 | Kamoi et al. |
| 5,291,481 A | 3/1994 | Doshi et al. |
| 5,339,311 A | 8/1994 | Turner |
| 5,367,520 A | 11/1994 | Cordell ........................ 370/60 |

| | | | | | | |
|---|---|---|---|---|---|---|
| 5,390,173 | A | 2/1995 | Spinney et al. | 6,308,220 B1 | 10/2001 | Mathur ........................ 709/238 |
| 5,425,022 | A | 6/1995 | Clark et al. | 6,311,204 B1 | 10/2001 | Mills et al. |
| 5,537,400 | A | 7/1996 | Diaz et al. | 6,314,477 B1 | 11/2001 | Cowger et al. |
| 5,568,165 | A | 10/1996 | Kimura | 6,324,181 B1 | 11/2001 | Wong et al. .................. 370/403 |
| 5,568,167 | A | 10/1996 | Galbi et al. | 6,330,236 B1 | 12/2001 | Ofek et al. .................... 370/369 |
| 5,579,443 | A | 11/1996 | Tatematsu et al. | 6,333,932 B1 | 12/2001 | Kobayasi et al. |
| 5,590,125 | A | 12/1996 | Acampora et al. | 6,335,935 B2 | 1/2002 | Kadambi et al. |
| 5,594,672 | A | 1/1997 | Hicks | 6,343,324 B1 | 1/2002 | Hubis et al. |
| 5,598,541 | A | 1/1997 | Malladi ........................ 395/286 | 6,353,612 B1 | 3/2002 | Zhu et al. |
| 5,610,745 | A | 3/1997 | Bennett ........................ 359/139 | 6,370,605 B1 | 4/2002 | Chong |
| 5,666,483 | A | 9/1997 | McClary | 6,397,360 B1 | 5/2002 | Bruns |
| 5,677,909 | A | 10/1997 | Heide | 6,401,128 B1 | 6/2002 | Stai et al. |
| 5,687,172 | A | 11/1997 | Cloonan et al. ............. 370/395 | 6,404,749 B1 | 6/2002 | Falk |
| 5,732,206 | A | 3/1998 | Mendel | 6,411,599 B1 | 6/2002 | Blanc et al. .................. 370/219 |
| 5,748,612 | A | 5/1998 | Stoevhase et al. ........... 370/230 | 6,411,627 B1 | 6/2002 | Hullett et al. |
| 5,757,771 | A | 5/1998 | Li et al. | 6,418,477 B1 | 7/2002 | Verma |
| 5,764,927 | A | 6/1998 | Murphy et al. | 6,421,342 B1 | 7/2002 | Schwartz et al. |
| 5,768,271 | A | 6/1998 | Seid et al. | 6,421,711 B1 * | 7/2002 | Blumenau et al. ........... 709/213 |
| 5,768,533 | A | 6/1998 | Ran | 6,424,658 B1 | 7/2002 | Mathur ........................ 370/429 |
| 5,784,358 | A | 7/1998 | Smith et al. | 6,438,628 B1 | 8/2002 | Messerly et al. |
| 5,790,545 | A | 8/1998 | Holt et al. | 6,449,274 B1 | 9/2002 | Holden et al. ................ 370/392 |
| 5,790,840 | A | 8/1998 | Bulka et al. | 6,452,915 B1 | 9/2002 | Jorgensen |
| 5,818,842 | A | 10/1998 | Burwell et al. .............. 370/397 | 6,467,008 B1 | 10/2002 | Gentry et al. ................ 710/261 |
| 5,821,875 | A | 10/1998 | Lee et al. | 6,470,026 B1 | 10/2002 | Pearson et al. |
| 5,822,300 | A | 10/1998 | Johnson et al. | 6,480,500 B1 | 11/2002 | Erimli et al. |
| 5,825,748 | A | 10/1998 | Barkey et al. | 6,509,988 B1 | 1/2003 | Saito |
| 5,828,475 | A | 10/1998 | Bennett et al. | 6,522,656 B1 | 2/2003 | Gridley |
| 5,835,748 | A | 11/1998 | Orenstein et al. | 6,532,212 B1 | 3/2003 | Soloway et al. |
| 5,835,752 | A | 11/1998 | Chiang et al. | 6,553,036 B1 | 4/2003 | Miller et al. |
| 5,850,386 | A | 12/1998 | Anderson et al. | 6,563,796 B1 | 5/2003 | Saito |
| 5,892,604 | A | 4/1999 | Yamanaka et al. | 6,570,850 B1 | 5/2003 | Gutierrez et al. |
| 5,894,560 | A | 4/1999 | Carmichael et al. | 6,570,853 B1 | 5/2003 | Johnson et al. |
| 5,925,119 | A | 7/1999 | Maroney | 6,594,231 B1 | 7/2003 | Byham et al. |
| 5,936,442 | A | 8/1999 | Liu et al. | 6,597,691 B1 | 7/2003 | Anderson et al. ........... 370/360 |
| 5,954,796 | A | 9/1999 | McCarty et al. | 6,606,690 B2 | 8/2003 | Padovano |
| 5,974,547 | A | 10/1999 | Klimenko | 6,614,796 B1 | 9/2003 | Black et al. |
| 5,978,379 | A | 11/1999 | Chan et al. | 6,622,206 B1 | 9/2003 | Kanamaru et al. |
| 5,987,028 | A | 11/1999 | Yang et al. .................. 370/380 | 6,629,161 B2 | 9/2003 | Matsuki et al. |
| 5,999,528 | A | 12/1999 | Chow et al. .................. 370/365 | 6,643,298 B1 | 11/2003 | Brunheroto et al. |
| 6,009,226 | A | 12/1999 | Tsuji et al. | 6,657,962 B1 | 12/2003 | Barri et al. |
| 6,011,779 | A | 1/2000 | Wills | 6,684,209 B1 | 1/2004 | Ito et al. |
| 6,014,383 | A | 1/2000 | McCarty ...................... 370/453 | 6,697,359 B1 | 2/2004 | George ........................ 370/357 |
| 6,021,128 | A | 2/2000 | Hosoya et al. .............. 370/380 | 6,697,368 B2 | 2/2004 | Chang et al. |
| 6,031,842 | A | 2/2000 | Trevitt et al. | 6,697,914 B1 | 2/2004 | Hospodor et al. |
| 6,046,979 | A | 4/2000 | Bauman | 6,718,497 B1 | 4/2004 | Whitby-Strevens |
| 6,047,323 | A | 4/2000 | Krause ........................ 709/227 | 6,738,381 B1 | 5/2004 | Agnevik et al. |
| 6,061,360 | A | 5/2000 | Miller et al. | 6,765,871 B1 | 7/2004 | Knobel et al. |
| 6,081,512 | A | 6/2000 | Muller et al. ................ 370/256 | 6,779,083 B2 | 8/2004 | Ito et al. |
| 6,108,738 | A | 8/2000 | Chambers et al. | 6,785,241 B1 | 8/2004 | Lu et al. |
| 6,108,778 | A | 8/2000 | LaBerge | 6,807,181 B1 | 10/2004 | Weschler |
| 6,118,776 | A | 9/2000 | Berman | 6,816,492 B1 | 11/2004 | Turner et al. |
| 6,118,791 | A | 9/2000 | Fichou et al. | 6,816,750 B1 | 11/2004 | Klaas |
| 6,128,292 | A | 10/2000 | Kim et al. .................... 370/356 | 6,859,435 B1 | 2/2005 | Lee et al. |
| 6,131,123 | A | 10/2000 | Hurst et al. | 6,865,155 B1 | 3/2005 | Wong et al. |
| 6,134,127 | A | 10/2000 | Kirchberg | 6,865,157 B1 | 3/2005 | Scott et al. |
| 6,144,668 | A | 11/2000 | Bass et al. | 6,888,831 B1 | 5/2005 | Hospodor et al. |
| 6,147,976 | A | 11/2000 | Shand et al. | 6,901,072 B1 | 5/2005 | Wong |
| 6,151,644 | A | 11/2000 | Wu | 6,904,053 B1 | 6/2005 | Berman |
| 6,158,014 | A | 12/2000 | Henson | 6,904,507 B2 | 6/2005 | Gil |
| 6,160,813 | A | 12/2000 | Banks et al. ................. 370/422 | 6,922,408 B2 | 7/2005 | Bloch et al. |
| 6,185,203 | B1 | 2/2001 | Berman | 6,928,470 B1 | 8/2005 | Hamlin |
| 6,201,787 | B1 | 3/2001 | Baldwin et al. | 6,934,799 B2 | 8/2005 | Acharya et al. |
| 6,209,089 | B1 | 3/2001 | Selitrennikoff et al. | 6,941,357 B2 | 9/2005 | Nguyen et al. |
| 6,229,822 | B1 | 5/2001 | Chow et al. | 6,941,482 B2 | 9/2005 | Strong |
| 6,230,276 | B1 | 5/2001 | Hayden | 6,947,393 B2 | 9/2005 | Hooper, III |
| 6,240,096 | B1 | 5/2001 | Book | 6,952,659 B2 | 10/2005 | King et al. |
| 6,252,891 | B1 | 6/2001 | Perches | 6,968,463 B2 | 11/2005 | Pherson et al. |
| 6,253,267 | B1 | 6/2001 | Kim et al. | 6,975,627 B1 | 12/2005 | Parry et al. |
| 6,278,708 | B1 | 8/2001 | Von Hammerstein et al. | 6,987,768 B1 | 1/2006 | Kojima et al. |
| 6,286,011 | B1 | 9/2001 | Velamuri et al. | 6,988,130 B2 | 1/2006 | Blumenau et al. |
| 6,289,002 | B1 | 9/2001 | Henson et al. | 6,988,149 B2 | 1/2006 | Odenwald |
| 6,301,612 | B1 | 10/2001 | Selitrennikoff et al. | 7,000,025 B1 | 2/2006 | Wilson |
| 6,307,857 | B1 | 10/2001 | Yokoyama et al. | 7,010,607 B1 | 3/2006 | Bunton |

| | | | |
|---|---|---|---|
| 7,024,410 B2 | 4/2006 | Ito et al. | |
| 7,031,615 B2 | 4/2006 | Genrile | |
| 7,039,070 B2 | 5/2006 | Kawakatsu | |
| 7,039,870 B2 | 5/2006 | Takaoka et al. | |
| 7,047,326 B1 | 5/2006 | Crosbie et al. | |
| 7,050,392 B2 | 5/2006 | Valdevit | |
| 7,051,182 B2 | 5/2006 | Blumenau et al. | |
| 7,055,068 B2 | 5/2006 | Riedl | |
| 7,061,862 B2 | 6/2006 | Horiguchi et al. | |
| 7,061,871 B2 | 6/2006 | Sheldon et al. | |
| 7,076,569 B1 | 7/2006 | Bailey et al. | |
| 7,082,126 B2 | 7/2006 | Ain et al. | |
| 7,092,374 B1 | 8/2006 | Gubbi | |
| 7,110,394 B1 | 9/2006 | Chamdani et al. | |
| 7,120,728 B2 | 10/2006 | Krakirian et al. | |
| 7,123,306 B1 | 10/2006 | Goto et al. | |
| 7,124,169 B2 | 10/2006 | Shimozono et al. | |
| 7,150,021 B1 | 12/2006 | Vajjhala et al. | |
| 7,151,778 B2 | 12/2006 | Zhu et al. | |
| 7,171,050 B2 | 1/2007 | Kim | |
| 7,185,062 B2 | 2/2007 | Lolayekar et al. | |
| 7,187,688 B2 | 3/2007 | Garmire et al. | |
| 7,188,364 B2 | 3/2007 | Volpano | |
| 7,194,538 B1 | 3/2007 | Rabe et al. | |
| 7,200,108 B2 | 4/2007 | Beer et al. | |
| 7,200,610 B1 | 4/2007 | Prawdiuk et al. | |
| 7,209,478 B2 | 4/2007 | Rojas et al. | |
| 7,215,680 B2 | 5/2007 | Mullendore et al. | |
| 7,221,650 B1 | 5/2007 | Cooper et al. | |
| 7,230,929 B2 | 6/2007 | Betker et al. | |
| 7,233,570 B2 | 6/2007 | Gregg | |
| 7,233,985 B2 | 6/2007 | Hahn et al. | |
| 7,245,627 B2 | 7/2007 | Goldenberg et al. | |
| 7,248,580 B2 | 7/2007 | George et al. | |
| 7,263,593 B2 | 8/2007 | Honda et al. | |
| 7,266,286 B2 | 9/2007 | Tanizawa et al. | |
| 7,269,131 B2 | 9/2007 | Cashman et al. | |
| 7,269,168 B2 | 9/2007 | Roy et al. | |
| 7,277,431 B2 | 10/2007 | Walter et al. | |
| 7,287,063 B2 | 10/2007 | Baldwin et al. | |
| 7,315,511 B2 | 1/2008 | Morita et al. | |
| 7,327,680 B1 | 2/2008 | Kloth | |
| 7,346,707 B1 | 3/2008 | Erimli | |
| 7,352,740 B2 | 4/2008 | Hammons et al. | |
| 7,397,788 B2 | 7/2008 | Mies et al. | |
| 7,406,034 B1 | 7/2008 | Cometto et al. | |
| 7,443,794 B2 | 10/2008 | George et al. | |
| 7,460,534 B1 | 12/2008 | Ballenger | |
| 7,466,700 B2 | 12/2008 | Dropps et al. | |
| 7,471,691 B2 | 12/2008 | Black et al. | |
| 2001/0011357 A1 | 8/2001 | Mori | |
| 2001/0022823 A1 | 9/2001 | Renaud | |
| 2001/0033552 A1 | 10/2001 | Barrack et al. | |
| 2001/0038628 A1 | 11/2001 | Ofek et al. | 370/392 |
| 2001/0043564 A1 | 11/2001 | Bloch et al. | |
| 2002/0016838 A1 | 2/2002 | Geluc et al. | |
| 2002/0034178 A1 | 3/2002 | Schmidt et al. | |
| 2002/0103913 A1 | 8/2002 | Tawil et al. | |
| 2002/0104039 A1 | 8/2002 | DeRolf et al. | |
| 2002/0118692 A1 | 8/2002 | Oberman et al. | |
| 2002/0122428 A1 | 9/2002 | Fan et al. | |
| 2002/0124124 A1 | 9/2002 | Matsumoto et al. | |
| 2002/0147560 A1 | 10/2002 | Devins et al. | |
| 2002/0147843 A1 | 10/2002 | Rao | |
| 2002/0156918 A1 | 10/2002 | Valdevit et al. | |
| 2002/0159385 A1 | 10/2002 | Susnow et al. | |
| 2002/0174197 A1 | 11/2002 | Schimke et al. | |
| 2002/0191602 A1 | 12/2002 | Woodring et al. | |
| 2002/0194294 A1 | 12/2002 | Blumenau et al. | |
| 2002/0196773 A1 | 12/2002 | Berman | |
| 2003/0002516 A1 | 1/2003 | Boock et al. | |
| 2003/0016683 A1 | 1/2003 | George et al. | |
| 2003/0021239 A1 | 1/2003 | Mullendore et al. | |
| 2003/0026267 A1 | 2/2003 | Oberman et al. | |
| 2003/0026287 A1 | 2/2003 | Mullendore et al. | |
| 2003/0033487 A1 | 2/2003 | Pfister et al. | |
| 2003/0035433 A1 | 2/2003 | Craddock et al. | |
| 2003/0046396 A1* | 3/2003 | Richter et al. | 709/226 |
| 2003/0056000 A1 | 3/2003 | Mullendore et al. | |
| 2003/0063567 A1 | 4/2003 | Dehart | |
| 2003/0072316 A1 | 4/2003 | Niu et al. | |
| 2003/0076788 A1 | 4/2003 | Grabauskas et al. | |
| 2003/0079019 A1 | 4/2003 | Lolayekar et al. | |
| 2003/0084219 A1 | 5/2003 | Yao et al. | |
| 2003/0086377 A1* | 5/2003 | Berman | 370/252 |
| 2003/0091062 A1 | 5/2003 | Lay et al. | |
| 2003/0093607 A1 | 5/2003 | Main et al. | |
| 2003/0103451 A1 | 6/2003 | Lutgen et al. | |
| 2003/0112819 A1 | 6/2003 | Kofoed et al. | |
| 2003/0115355 A1 | 6/2003 | Cometto et al. | |
| 2003/0117961 A1 | 6/2003 | Chuah et al. | |
| 2003/0118053 A1 | 6/2003 | Edsall et al. | |
| 2003/0120743 A1 | 6/2003 | Coatney et al. | |
| 2003/0120791 A1 | 6/2003 | Weber et al. | |
| 2003/0126223 A1 | 7/2003 | Jenne et al. | |
| 2003/0126242 A1 | 7/2003 | Chang | |
| 2003/0131105 A1 | 7/2003 | Czeiger et al. | |
| 2003/0137941 A1 | 7/2003 | Kaushik et al. | |
| 2003/0139900 A1 | 7/2003 | Robison | |
| 2003/0172149 A1 | 9/2003 | Edsall et al. | |
| 2003/0172239 A1 | 9/2003 | Swank | |
| 2003/0174652 A1 | 9/2003 | Ebata | |
| 2003/0174721 A1 | 9/2003 | Black et al. | |
| 2003/0174789 A1 | 9/2003 | Waschura et al. | |
| 2003/0179709 A1 | 9/2003 | Huff | |
| 2003/0179748 A1 | 9/2003 | George et al. | 370/389 |
| 2003/0179755 A1 | 9/2003 | Fraser | |
| 2003/0189930 A1 | 10/2003 | Terrell et al. | |
| 2003/0189935 A1 | 10/2003 | Warden et al. | |
| 2003/0191857 A1 | 10/2003 | Terell et al. | |
| 2003/0195983 A1 | 10/2003 | Krause | |
| 2003/0198238 A1 | 10/2003 | Westby | |
| 2003/0200315 A1 | 10/2003 | Goldenberg et al. | |
| 2003/0210686 A1 | 11/2003 | Terrell et al. | |
| 2003/0218986 A1 | 11/2003 | DeSanti et al. | |
| 2003/0229808 A1 | 12/2003 | Heintz et al. | |
| 2003/0236953 A1 | 12/2003 | Grieff et al. | |
| 2004/0013088 A1 | 1/2004 | Gregg | |
| 2004/0013092 A1 | 1/2004 | Betker et al. | |
| 2004/0013113 A1 | 1/2004 | Singh et al. | |
| 2004/0013125 A1 | 1/2004 | Betker et al. | |
| 2004/0015638 A1 | 1/2004 | Forbes | |
| 2004/0024831 A1 | 2/2004 | Yang et al. | |
| 2004/0028038 A1 | 2/2004 | Anderson et al. | |
| 2004/0054776 A1 | 3/2004 | Klotz et al. | |
| 2004/0054866 A1 | 3/2004 | Blumenau et al. | |
| 2004/0057389 A1 | 3/2004 | Klotz et al. | |
| 2004/0064664 A1 | 4/2004 | Gil | |
| 2004/0081186 A1 | 4/2004 | Warren et al. | |
| 2004/0081196 A1 | 4/2004 | Elliott | |
| 2004/0085955 A1 | 5/2004 | Walter et al. | |
| 2004/0085974 A1 | 5/2004 | Mies et al. | |
| 2004/0085994 A1 | 5/2004 | Warren et al. | |
| 2004/0092278 A1 | 5/2004 | Diepstraten et al. | |
| 2004/0100944 A1 | 5/2004 | Richmond et al. | |
| 2004/0109418 A1 | 6/2004 | Fedorkow et al. | |
| 2004/0120340 A1 | 6/2004 | Furey et al. | |
| 2004/0123181 A1 | 6/2004 | Moon et al. | |
| 2004/0125799 A1 | 7/2004 | Buer | |
| 2004/0141518 A1 | 7/2004 | Milligan et al. | |
| 2004/0141521 A1 | 7/2004 | George | 370/463 |
| 2004/0151188 A1 | 8/2004 | Maveli et al. | |
| 2004/0153526 A1 | 8/2004 | Haun et al. | |
| 2004/0153566 A1 | 8/2004 | Lalsangi et al. | |
| 2004/0153914 A1 | 8/2004 | El-Batal | |
| 2004/0174813 A1 | 9/2004 | Kasper et al. | |

| | | | |
|---|---|---|---|
| 2004/0202189 | A1 | 10/2004 | Arndt et al. |
| 2004/0208201 | A1 | 10/2004 | Otake |
| 2004/0218531 | A1 | 11/2004 | Cherian et al. |
| 2004/0267982 | A1 | 12/2004 | Jackson et al. |
| 2005/0018673 | A1 | 1/2005 | Dropps et al. |
| 2005/0023656 | A1 | 2/2005 | Leedy |
| 2005/0033878 | A1 | 2/2005 | Pangal et al. |
| 2005/0036485 | A1 | 2/2005 | Eilers et al. |
| 2005/0036499 | A1 | 2/2005 | Dutt et al. |
| 2005/0036763 | A1 | 2/2005 | Kato et al. |
| 2005/0047334 | A1 | 3/2005 | Paul et al. |
| 2005/0073956 | A1 | 4/2005 | Moores et al. |
| 2005/0076113 | A1 | 4/2005 | Klotz et al. |
| 2005/0088969 | A1 | 4/2005 | Carlsen et al. |
| 2005/0108444 | A1 | 5/2005 | Flauaus et al. |
| 2005/0111845 | A1 | 5/2005 | Nelson et al. |
| 2005/0117522 | A1 | 6/2005 | Basavaiah et al. |
| 2005/0177641 | A1 | 8/2005 | Yamagami |
| 2005/0188245 | A1 | 8/2005 | Seto et al. |
| 2005/0198523 | A1 | 9/2005 | Shanbhag et al. |
| 2006/0013248 | A1 | 1/2006 | Mujeeb et al. |
| 2006/0023751 | A1 | 2/2006 | Wilson et al. |
| 2006/0034192 | A1 | 2/2006 | Hurley et al. |
| 2006/0034302 | A1 | 2/2006 | Peterson |
| 2006/0047852 | A1 | 3/2006 | Shah et al. |
| 2006/0074927 | A1 | 4/2006 | Sullivan et al. |
| 2006/0107260 | A1 | 5/2006 | Motta |
| 2006/0143300 | A1 | 6/2006 | See et al. |
| 2006/0184711 | A1 | 8/2006 | Pettey |
| 2006/0203725 | A1 | 9/2006 | Paul et al. |
| 2006/0274744 | A1 | 12/2006 | Nagai et al. |
| 2007/0206502 | A1 | 9/2007 | Martin et al. |

FOREIGN PATENT DOCUMENTS

| | | |
|---|---|---|
| EP | 0649098 | 9/1994 |
| EP | 0856969 | 1/1998 |
| WO | WO-98/36537 | 8/1998 |
| WO | WO-01/95566 | 12/2001 |
| WO | WO03/088050 | 10/2003 |

OTHER PUBLICATIONS

Clark, Tom, "Zoning for Fibre Channel Fabrics", Vixel Corporation Paper—XP002185194., (Aug. 1999), pp. 1-6.
Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.
Martin, Charles R., "Fabric Interconnection of fibre channel standard nodes", Proceedings of the SPIE, (Sep. 8, 1992), pp. 65-71.
Yoshida, Hu, "LUN Security Considerations for Storage Area Networks," Hitachi Data Systems Paper—XP 002185193 (1999), pp. 1-7.
Claudio DeSanti, "Virtual Fabrics Switch Support"; VF Switch Support, T11/04-395v2. Sep. 2004, pp. 1-15.
Pelissier et al, "Inter-Fabric Routing", dated Jul. 30, 2004, Inter Fabric Routing (04-520v0); pp. 1-31.
DeSanti et al, "Virtual Fabrics"; Virtual Fabrics, T11/03-352v0, May 2003; pp. 1-4.
Martin et al , "Virtual Channel Architecture", Presentation by Brocade to T11/03-369V0 dated Jun. 2, 2003.
Curtis, A. R., "Design Considerations for 10-Gbit Fibre Channel", *Curtis A. Ridgeway, Distinguished I/O Architect, Storage and Computing ASIC's Division, LSI Logic Corp.*
Malavalli, Kumar , "High Speed Fibre Channel Switching Fabric Devices", *Proceedings of the SPIE, SPIE*, Bellingham, VA, USA vol. 1577, XP000562869, ISSN: 0277-786X, (Sep. 4, 1991),216-226.
Melhem, et al., "Minimizing Wavelength Conversions in WDM Path Establishment", *Computer Science Department, University of Pittsburgh*, Pittsburgh, PA 15260, (2001), 197-211.
Ridgeway, Curt, "0GFC-40GFC using 4-lane XAUI's", *LSI Logic Presentation—T11/03-069v0*.

Banks, David C., et al., "Link Trunking and Measuring Link Latency in Fibre Channel Fabric", U.S. Appl. No. 60/286,046, 1-52.
Brown, Douglas W., "A State-Machine Synthesizer", *18th Design Automation Conference*, (1981),301-305.
International Preliminary Report on Patentability dated Apr. 3, 2007, for International patent application No. PCT/US2005/034844.
International Preliminary Report on Patentability dated Apr. 3, 2007, for International patent application No. PCT/US2005/034758.
International Preliminary Report on Patentability dated Apr. 11, 2007, for International patent application No. PCT/US2005/034845.
International Preliminary Report on Patentability dated Apr. 3, 2007, for International patent application No. PCT/US2005/035064.
International Preliminary Report on Patentability dated Jul. 24, 2007, for International patent application No. PCT/US2005/42528.
"Notice of Allowance from USPTO dated Feb. 8, 2008 for U.S. Appl. No. 10/894,529".
"Office Action from USPTO dated Feb. 12, 2008 for U.S. Appl. No. 11/057,912".
"Office Action from USPTO dated Mar. 5, 2008 for U.S. Appl. No. 10/889,259".
"Office Action from USPTO dated Mar. 7, 2008 for U.S. Appl. No. 10/894,629".
"Office Action from USPTO dated Mar. 20, 2008 for U.S. Appl. No. 10/894,732".
"Notice of Allowance from USPTO dated Aug. 18, 2008 for U.S. Appl. No. 10/889,259".
"Final Office Action from USPTO dated Aug. 20, 2008 for U.S. Appl. No. 10/798,468".
"Office Action from USPTO dated Sep. 18, 2008 for U.S. Appl. No. 10/894,978".
"Final Office Action from USPTO dated Jan. 21, 2009 for U.S. Appl. No. 10/894,827".
"Office Action from USPTO dated Jan. 17, 2009 for U.S. Appl. No. 10/894,586".
"Final Office Action from USPTO dated Jan. 26, 2009 for U.S. Appl. No. 10/895,175".
"Notice of Allowance from USPTO dated Feb. 10, 2009 for U.S. Appl. No. 10/894,595".
"Office Action from USPTO dated Feb. 17, 2009 for U.S. Appl. No. 10/894,732".
"Notice of Allowance from USPTO dated Feb. 25, 2009 for U.S. Appl. No. 10/894,827".
"Notice of Allowance from USPTO dated Feb. 27, 2009 for U.S. Appl. No. 10/895,175".
"Final Office Action from USPTO dated Apr. 1, 2008 for U.S. Appl. No. 10/956,717".
"Office Action from USPTO dated Apr. 3, 2008 for U.S. Appl. No. 10/894,587".
"Notice of Allowance from USPTO dated Jul. 9, 2008 for U.S. Appl. No. 10/894,579".
"Notice of Allowance from USPTO dated Jul. 17, 2008 for U.S. Appl. No. 10/894,536".
"Office Action from USPTO dated Jul. 25, 2008 for U.S. Appl. No. 10/894,827".
"Final Office Action from USPTO Dated Aug. 4, 2008 for U.S. Appl. No. 10/894,732".
"Notice of Allowance from USPTO dated Apr. 4, 2008 for U.S. Appl. No. 11/608,634".
"Office Action from USPTO dated Apr. 4, 2008 for U.S. Appl. No. 10/957,465".
"Notice of Allowance from USPTO dated Apr. 10, 2008 for U.S. Appl. No. 10/241,153".
"Office Action from USPTO dated Apr. 11, 2008 for U.S. Appl. No. 10/894,595".
"Office Action from USPTO dated Apr. 17, 2008 for U.S. Appl. No. 10/894,689".
"Notice of Allowance from USPTO dated Apr. 18, 2008 for U.S. Appl. No. 10/894,597".
"Final Office Action from USPTO dated Apr. 23, 2008 for U.S. Appl. No. 10/889,255".
"Final Office Action from USPTO dated Apr. 25, 2008 for U.S. Appl. No. 10/894,579".

"Final Office Action from USPTO dated Apr. 29, 2008 for U.S. Appl. No. 10/894,491".
"Office Action from USPTO dated May 2, 2008 for U.S. Appl. No. 11/037,922".
"Final Office Action from USPTO dated May 12, 2008 for U.S. Appl. No. 10/894,492".
"Office Action from USPTO dated May 14, 2008 for U.S. Appl. No. 10/956,502".
"Office Action from USPTO dated May 15, 2008 for U.S. Appl. No. 10/798,527".
"Final Office Action from USPTO dated May 21, 2008 for U.S. Appl. No. 10/889,635".
"Final Office Action from USPTO dated Jun. 4, 2008 for U.S. Appl. No. 10/894,978".
"Final Office Action from USPTO dated Jun. 5, 2008 for U.S. Appl. No. 10/889,267".
"Final Office Action from USPTO dated Jun. 10, 2008 for U.S. Appl. No. 10/894,586".
"Office Action from USPTO dated Jun. 25, 2008 for U.S. Appl. No. 10/895,175".
"Notice of Allowance from USPTO dated Jun. 25, 2008 for U.S. Appl. No. 10/894,491".
"Notice of Allowance from USPTO dated Jun. 27, 2008 for U.S. Appl. No. 10/956,717".
"Office Action from USPTO dated Jun. 26, 2008 for U.S. Appl. No. 10/894,547".
"Office Action from USPTO dated Jun. 27, 2008 for U.S. Appl. No. 10/894,726".
"Final Office Action from USPTO dated Jul. 9, 2008 for U.S. Appl. No. 10/894,917".
"Notice of Allowance from USPTO dated Jul. 9, 2008 for U.S. Appl. No. 10/894,629".
"Notice of Allowance from USPTO dated Mar. 6, 2009 for U.S. Appl. No. 10/956,502".
"Office Action from USPTO dated Mar. 9, 2009 for U.S. Appl. No. 11/057,912".
"Notice of Allowance from USPTO dated Mar. 9, 2009 for U.S. Appl. No. 10/889,635".
"Office Action from USPTO dated Mar. 16, 2009 for U.S. Appl. No. 10/956,501".
"Notice of Allowance from USPTO dated Mar. 20, 2009 for U.S. Appl. No. 10/894,978".
"Notice of Allowance from USPTO dated Mar. 23, 2009 for U.S. Appl. No. 12/198,644".
"Office Action from USPTO dated Mar. 25, 2009 for U.S. Appl. No. 10/894,546".
"Notice of Allowance from USPTO dated Mar. 31, 2009 for U.S. Appl. No. 12/031,585".
"Office Action from USPTO dated Apr. 2, 2009 for U.S. Appl. No. 10/889,256".
"Examination Report from European Patent Office dated Mar. 27, 2009 for European Application No. 05798761.2".
"Notice of Allowance from USPTO dated Apr. 27, 2009 for U.S. Appl. No. 11/363,365".
Curtis, A. R., "Design Considerations for 10-Gbit Fibre Channel", *Curtis A. Ridgeway, Distinguished I/O Architect, Storage and Computing ASIC's Division, LSI Logic Corp.*, Feb. 3, 2003.
Ridgeway, Curt, "0GFC-40GFC using 4-lane XAUI's", *LSI Logic Presentation—T11/03-069v0*, Apr. 14, 2003.
"Examination Report from the European Patent Office dated Oct. 12, 2007 for European Application No. 05 805 632.6".
Malavalli, et al., "Fibre Channel Framing and Signaling (FC-FS) REV 1.10", *NCITS working draft proposed American National Standard for Information Technology*, (Jan. 25, 2001).
"Office Action from USPTO dated Jun. 28, 2007 for U.S. Appl. No. 10/894,529".
"Office Action from USPTO dated Sep. 14, 2007 for U.S. Appl. No. 10/894,978".
"Office Action from USPTO dated Apr. 6, 2007 for U.S. Appl. No. 10/956,718".
"Office Action from USPTO dated Oct. 3, 2007 for U.S. Appl. No. 10/956,717".

"Office Action from USPTO dated Jun. 1, 2007 for U.S. Appl. No. 10/961,463".
"Office Action from USPTO dated Sep. 6, 2007 for U.S. Appl. No. 10/889,337".
"Office Action from USPTO dated Dec. 7, 2007 for U.S. Appl. No. 10/961,463".
"Notice of Allowance from USPTO dated Dec. 21, 2007 for U.S. Appl. No. 10/961,463".
"Notice of Allowance from USPTO dated Dec. 20, 2007 for U.S. Appl. No. 10/889,337".
"Notice of Allowance from USPTO dated Jan. 8, 2008 for U.S. Appl. No. 10/889,551".
"Office Action from USPTO dated Jan. 9, 2008 for U.S. Appl. No. 10/798,468".
"Office Action from USPTO dated Jan. 9, 2008 for U.S. Appl. No. 11/608,634".
"Notice of Allowance from USPTO dated Jan. 11, 2008 for U.S. Appl. No. 10/664,548".
"Notice of Allowance from USPTO dated Jan. 10, 2008 for U.S. Appl. No. 10/263,858".
"Office Action from USPTO dated Jan. 19, 2006 for U.S. Appl. No. 10/212,425".
"Office Action from USPTO dated Dec. 5, 2006 for U.S. Appl. No. 10/212,425".
"Office Action from USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 16, 2007 for U.S. Appl. No. 10/241,153".
"Office Action from USPTO dated Nov. 15, 2006 for U.S. Appl. No. 10/263,858".
"Office Action from USPTO dated Jul. 11, 2007 for U.S. Appl. No. 10/263,858".
"Office Action from USPTO dated Jul. 3, 2007 2007 for U.S. Appl. No. 10/664,548".
"Office Action from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Aug. 31, 2007 for U.S. Appl. No. 10/889,635".
"Office Action from USPTO dated Mar. 21, 2006 for U.S. Appl. No. 10/889,588".
"Office Action from USPTO dated Sep. 10, 2007 for U.S. Appl. No. 10/889,255".
"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Sep. 19, 2007 for U.S. Appl. No. 10/894,492".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Oct. 25, 2007 for U.S. Appl. No. 10/894,536".
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Sep. 23, 2008 for U.S. Appl. No. 12/031,585".
"Project-T11/1619-D/Rev. 0.50", *Information technology Industry Council, Fibre Channel: Framing and Signaling-2*, Dec. 2004, Rev. 0.50, (Dec. 2004), 76, 81, 114, 115.

"Notice of Allowance from the USPTO dated Sep. 29, 2008 for U.S. Appl. No. 10/889,267".
"Office Action from USPTO dated Sep. 29, 2008 for U.S. Appl. No. 11/363,365".
"Final Office Action from USPTO dated Oct. 8, 2008 for U.S. Appl. No. 11/057,912".
"Notice of Allowance from USPTO dated Oct. 8, 2008 for U.S. Appl. No. 10/889,255".
"Notice of Allowance from USPTO dated Oct. 8, 2008 for U.S. Appl. No. 10/798,527".
"Notice of Allowance from USPTO dated Oct. 15, 2008 for U.S. Appl. No. 10/894,492".
"Final Office Action from USPTO dated Oct. 17, 2008 for U.S. Appl. No. 10/894,595".
"Final Office Action from USPTO dated Nov. 13, 2008 for U.S. Appl. No. 10/894,587".
"Office Action from USPTO dated Nov. 13, 2008 for U.S. Appl. No. 10/894,917".
"Office Action from USPTO dated Nov. 26, 2008 for U.S. Appl. No. 10/956,502".
"Office Action from USPTO dated Nov. 26, 2008 for U.S. Appl. No. 10/894,547".
"Office Action from USPTO dated Dec. 16, 2008 for U.S. Appl. No. 11/560,317".
"Final Office Action from USPTO dated Dec. 24, 2008 for U.S. Appl. No. 10/894,726".
"Office Action from USPTO dated Dec. 23, 2008 for U.S. Appl. No. 10/798,468".
"Notice of Allowance from USPTO dated Dec. 30, 2008 for U.S. Appl. No. 11/037,922".

* cited by examiner

*Primary Examiner*—Ricky Ngo
*Assistant Examiner*—Chandrahas Patel
(74) *Attorney, Agent, or Firm*—Klein, O'Neill & Singh, LLP

(57) ABSTRACT

A method and system for routing fiber channel frames using a fiber channel switch element is provided. The switch element includes, a look up table that is indexed by domain, area, a virtual storage area number and/or AL_PA values of frames entering the fiber channel switch element; and logic for generating a column select signal that is used to select a column from the look up table for frame routing information. The switch element also includes logic for validating a frame route by performing word depth match. A register is used to load look up table entries and column entries are selected based on the column select signal. The method includes, indexing a look up table with plural fiber channel frame header values; selecting a table value for routing a fiber channel frame based on a column select signal; and routing the frame if a route is valid.

20 Claims, 13 Drawing Sheets

Load Balancing

Preferred Route

METHOD AND SYSTEM FOR PROGRAMMABLE DATA DEPENDANT NETWORK ROUTING

CROSS REFERENCE TO RELATED APPLICATIONS

This application claims priority under 35 U.S.C. § 119(e)(1) to the following provisional patent applications:

Filed on Sep. 19, 2003, Ser. No. 60/503,812, entitled "Method and System for Fibre Channel Switches";

Filed on Jan. 21, 2004, Ser. No. 60/537,933 entitled "Method And System For Routing And Filtering Network (Data Packets In Fibre Channel Systems";

Filed on Jul. 21, 2003, Ser. No. 60/488,757, entitled "Method and System for Selecting Virtual Lanes in Fibre Channel Switches";

Filed on Dec. 29, 2003, Ser. No. 60/532,965, entitled "Programmable Pseudo Virtual Lanes for Fibre Channel Systems";

Filed on Sep. 19, 2003, Ser. No. 60/504,038, entitled" Method and System for Reducing Latency and Congestion in Fibre Channel Switches;

Filed on Aug. 14, 2003, Ser. No. 60/495,212, entitled "Method and System for Detecting Congestion and Over Subscription in a Fibre channel Network";

Filed on Aug. 14, 2003, Ser. No. 60/495, 165, entitled "LUN Based Hard Zoning in Fibre Channel Switches";

Filed on Sep. 19, 2003, Ser. No. 60/503,809, entitled "Multi Speed Cut Through Operation in Fibre Channel Switches";

Filed on Sep. 23, 2003, Ser. No. 60/505,381, entitled "Method and System for Improving bandwidth and reducing Idles in Fibre Channel Switches";

Filed on Sep. 23, 2003, Ser. No. 60/505,195, entitled "Method and System for Keeping a Fibre Channel Arbitrated Loop Open During Frame Gaps";

Filed on Mar. 30, 2004, Ser. No. 60/557,613, entitled "Method and System for Congestion Control based on Optimum Bandwidth Allocation in a Fibre Channel Switch";

Filed on Sep. 23, 2003, Ser. No. 60/505,075, entitled "Method and System for Programmable Data Dependent Network Routing";

Filed on Sep. 19, 2003, Ser. No. 60/504,950, entitled "Method and System for Power Control of Fibre Channel Switches";

Filed on Dec. 29, 2003, Ser. No. 60/532,967, entitled "Method and System for Buffer to Buffer Credit recovery in Fibre Channel Systems Using Virtual and/or Pseudo Virtual Lane";

Filed on Dec. 29, 2003, Ser. No. 60/532,966, entitled "Method And System For Using Extended Fabric Features With Fibre Channel Switch Elements";

Filed on Mar. 4, 2004, Ser. No. 60/550,250, entitled "Method And System for Programmable Data Dependent Network Routing";

Filed on May 7, 2004, Ser. No. 60/569,436, entitled "Method And System For Congestion Control In A Fibre Channel Switch";

Filed on May 18, 2004, Ser. No. 60/572,197, entitled "Method and System for Configuring Fibre Channel Ports" and Filed on Dec. 29, 2003, Ser. No. 60/532,963 entitled "Method and System for Managing Traffic in Fibre Channel Switches".

The disclosure of the foregoing applications is incorporated herein by reference in their entirety.

BACKGROUND

1. Field of the Invention

The present invention relates to network systems, and more particularly, to programmable routing.

2. Background of the Invention

Fibre channel is a set of American National Standard Institute (ANSI) standards which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames that a buffer can hold per fabric port.

Typically, fibre channel switches route frames to other switches based on frame destination address (D_ID), using the lower 8 bits of the D_ID. Usually for a receiving port and destination switch only one route IS used. This can result in inefficient routing in modern fabrics because sometimes load balancing is needed. In addition, a preferred route may be useful for certain ports sending high priority data. Conventional routing techniques do not provide load balancing and preferred routing using D_ID fields.

Therefore, what is required is a system that is flexible and versatile that can perform intelligent routing based on a fabric needs.

SUMMARY OF THE PRESENT INVENTION

A method for routing fibre channel frames using a fibre channel switch element is provided. The method includes, indexing a look up table with plural fibre channel frame header values; selecting a table value for routing a fibre channel frame based on a column select signal; and routing the frame if a route is valid. A fibre channel domain, area, a virtual storage area number and/or AL_PA values are used to index table rows. A valid route is determined by matching a correct word depth with a frame word depth. A frame's D_ID, S_ID, OX_ID, or any other bit is used to select a column for frame routing information.

In yet another aspect of the present invention, a fibre channel switch element for routing fibre channel frames is provided. The switch element includes, a look up table that is indexed by domain, area, a virtual storage area number and/or AL_PA values of frames entering the fibre channel switch element; and logic for generating a column select signal that is used to select a column from the look up table to route fibre channel frames.

The switch element also includes logic for validating a frame route by performing word depth match. A register is used to load look up table entries and column entries are selected based on the column select signal.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions

The following definitions are provided as they are typically (but not exclusively) used in the fibre channel environment, implementing the various adaptive aspects of the present invention.

"D_ID": A 24-bit field in the Fibre Channel Frame header that contains the destination address for a frame.

"Domain": Bits 16-23 of a Fibre Channel Address, that usually corresponds to a switch.

"E-Port": A fabric expansion port that attaches to another Interconnect port to create an Inter-Switch Link.

"F_Port": A port to which non-loop N_Ports are attached to a fabric and does not include FL_ports.

"Fibre channel ANSI Standard": The standard (incorporated herein by reference in its entirety) describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": The structure or organization of a group of switches, target and host devices (NL_Port, N_ports etc.).

"Fabric Topology": This is a topology where a device is directly attached to a fibre channel fabric that uses destination identifiers embedded in frame headers to route frames through a fibre channel fabric to a desired destination.

Port: A general reference to N. Sub.--Port or F.Sub.--Port.

"L_Port": A port that contains Arbitrated Loop functions associated with the Arbitrated Loop topology.

"N-Port": A direct fabric attached port.

"NL_Port": A L_Port that can perform the function of a N_Port.

"S_ID": This is a 24-bit field in the Fibre Channel frame header that contains the source address for a frame.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

Figure 1A:
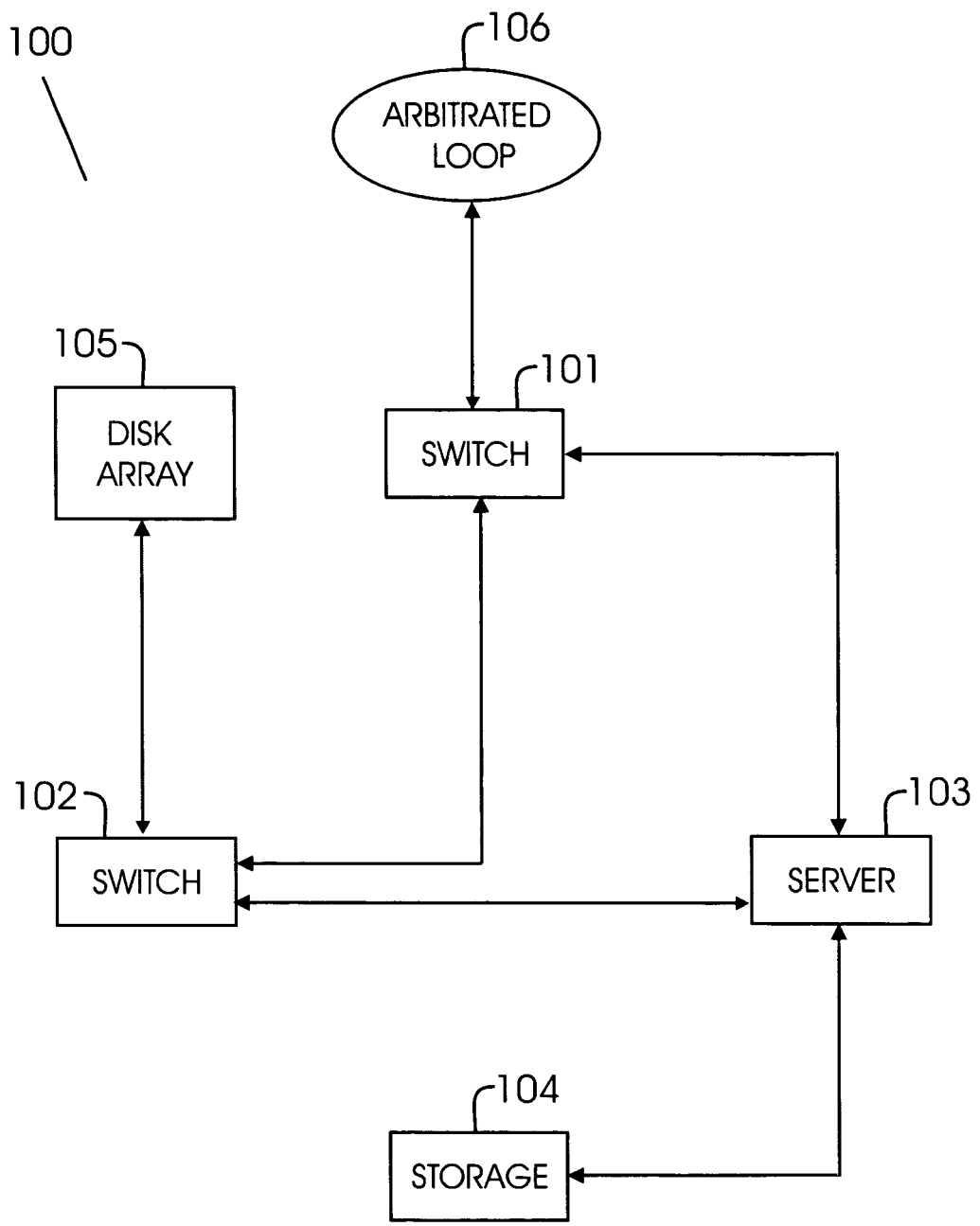
FIG. 1A shows an example of a Fibre Channel network system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fabric Switch Element

Figure 1B:
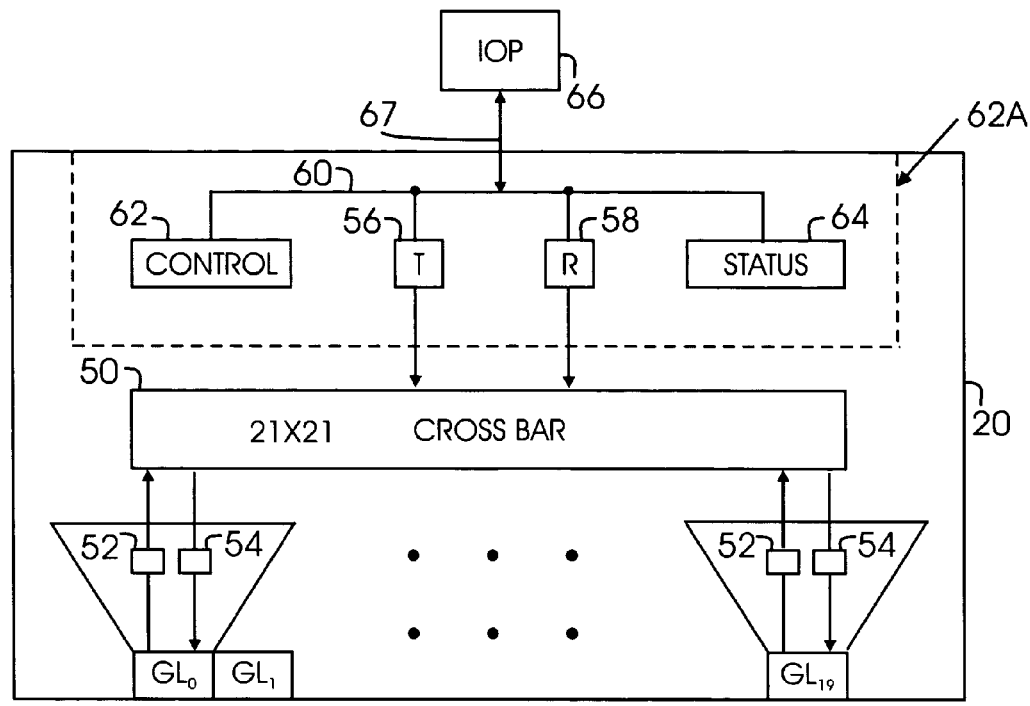
FIG. 1B shows an example of a Fibre Channel switch element, according to one aspect of the present invention.

FIG. 1B is a block diagram of a 20-port ASIC ("Application Specific Integrated Circuit" fabric element according to one aspect of the present invention. FIG. 1B provides the general architecture of a 20-channel switch chassis using the 20-port fabric element. Fabric element includes ASIC 20 with non-blocking fibre channel class 2 (connectionless. acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example F_Port. FL_Port and E-Port. In other words, depending upon what it is attached to, each generic port (also referred to as GL Ports) can function as any type of port. Also, the GL port may function as a special port useful in fabric element linking, as described below.

For illustration purposes only, all GL ports are drawn on the same side of ASIC 20 in FIG. 1B.

However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
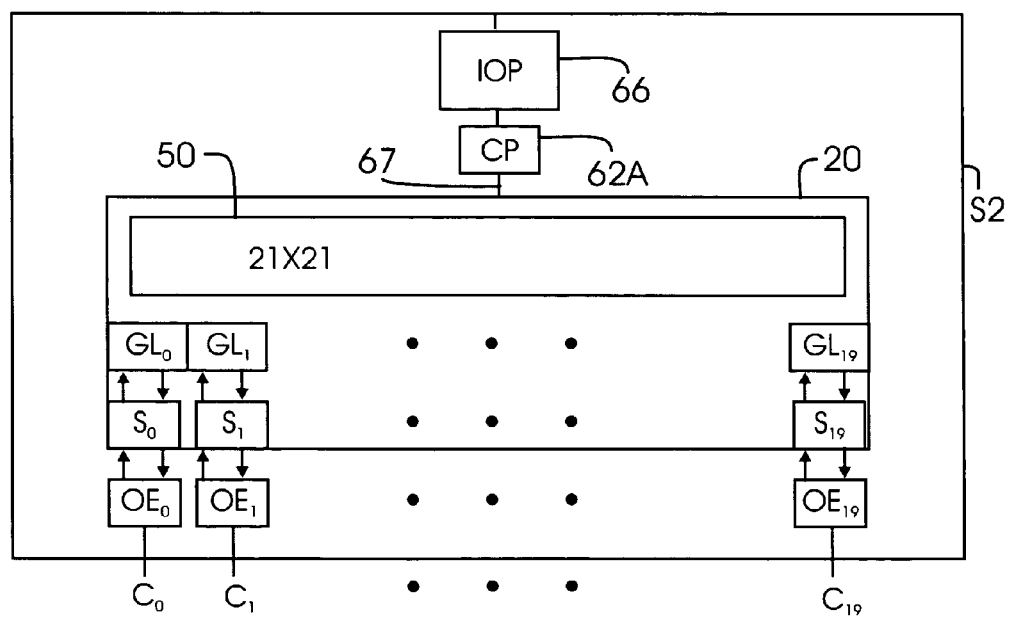
FIG. 1C shows a block diagram of a 20-channel switch chassis, according to one aspect of the present invention.

In the preferred embodiments of switch chassis described herein, the fabric controller is a firmware-programmed microprocessor, also referred to as the input/out processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56 (also referred to as "T"), receive buffer 58 (also referred to as "R"), control register 6 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL ports correspond to channel (also referred to as "C") C0-C19. Each GL port has a serial/deserializer (SERDES) (also referred to as "S") designated as S0-S19. Ideally, the SERDES functions are implemented on ASIC 20 for efficiency, but may alternatively be external to each GL port.

Each GL port has an optical-electric converter (also referred to as "OE"), designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
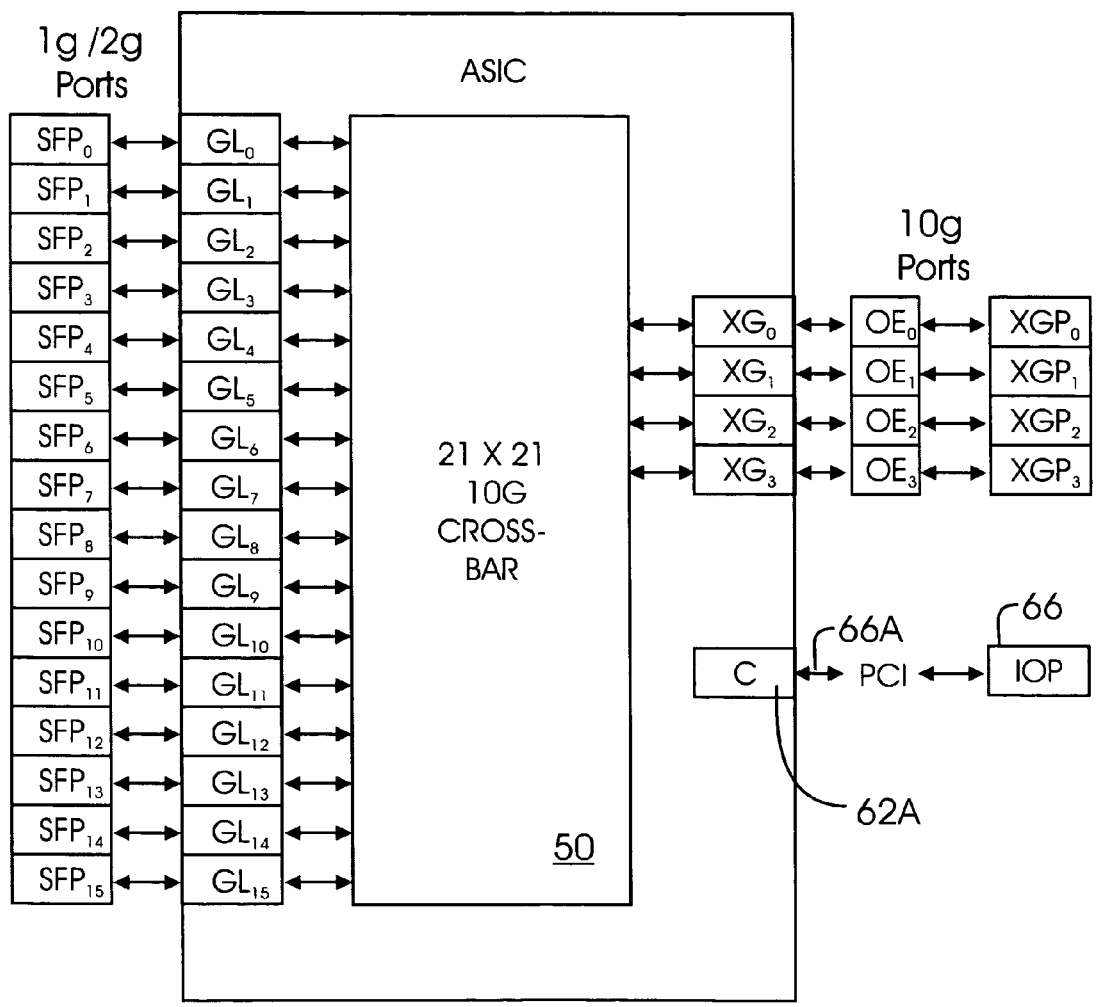
FIG. 1D shows a block diagram of a Fibre Channel switch element with sixteen GL_Ports and four 10 G ports, according to one aspect of the present invention.

FIG. 1D shows a block diagram of ASIC 20 with sixteen GL ports and four 10 G (Gigabyte) port control modules designated as $XG_0$-$XG_3$ for four 10 G ports designated as XGP0-XGP3. GL ports ($GL_0$-$GL_{15}$) communicate with 1 g/2 g SFP Port modules $SFP_0$-$SFP_{15}$. SFP is a small form factor pluggable optical transceiver. ASIC 20 include a control port 62A (also referred to as "CP") that is coupled to IOP 66 through a peripheral component interconnect "PCI" connection 66A.

Figures 1, 1E:
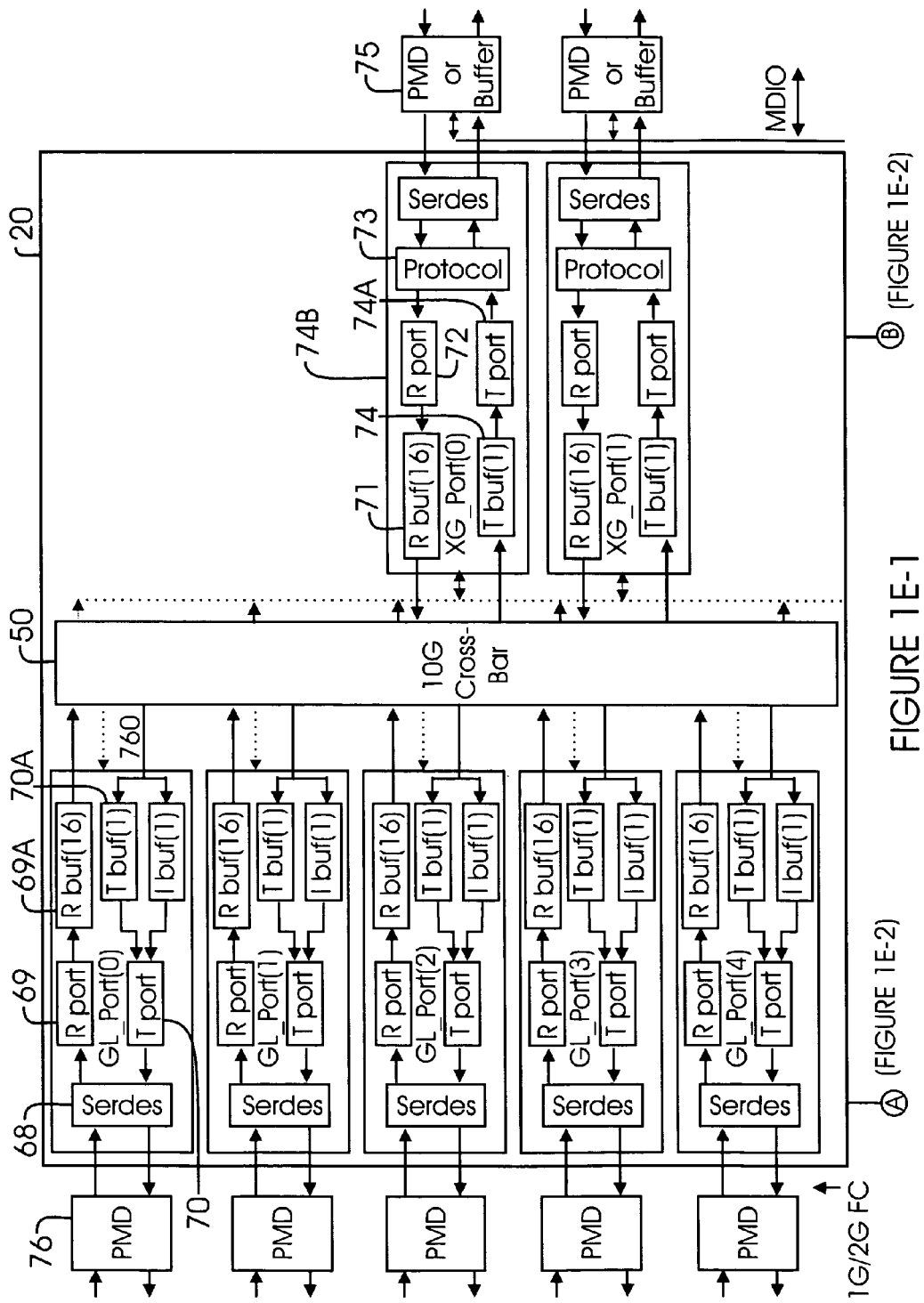
FIGS. 1E-1/1E-2 (jointly referred to as FIG. 1E) show another block diagram of a Fibre Channel switch element with sixteen GL_Ports and four 10 G ports, according to one aspect of the present invention.

FIG. 1E-1/1E-2 (jointly referred to as FIG. 1E) show yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A, as described below in detail. GL and XG port control modules are coupled to physical media devices ("PMD") 76 and 75 respectively.

Control port module 62A includes control buffers 62B and 62D for transmit & receive sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF and TPORT similar to TBUF 70A and TPORT 70. Protocol module 73 interfaces with SERDES to handle protocol based functionality.

Figure 3A:
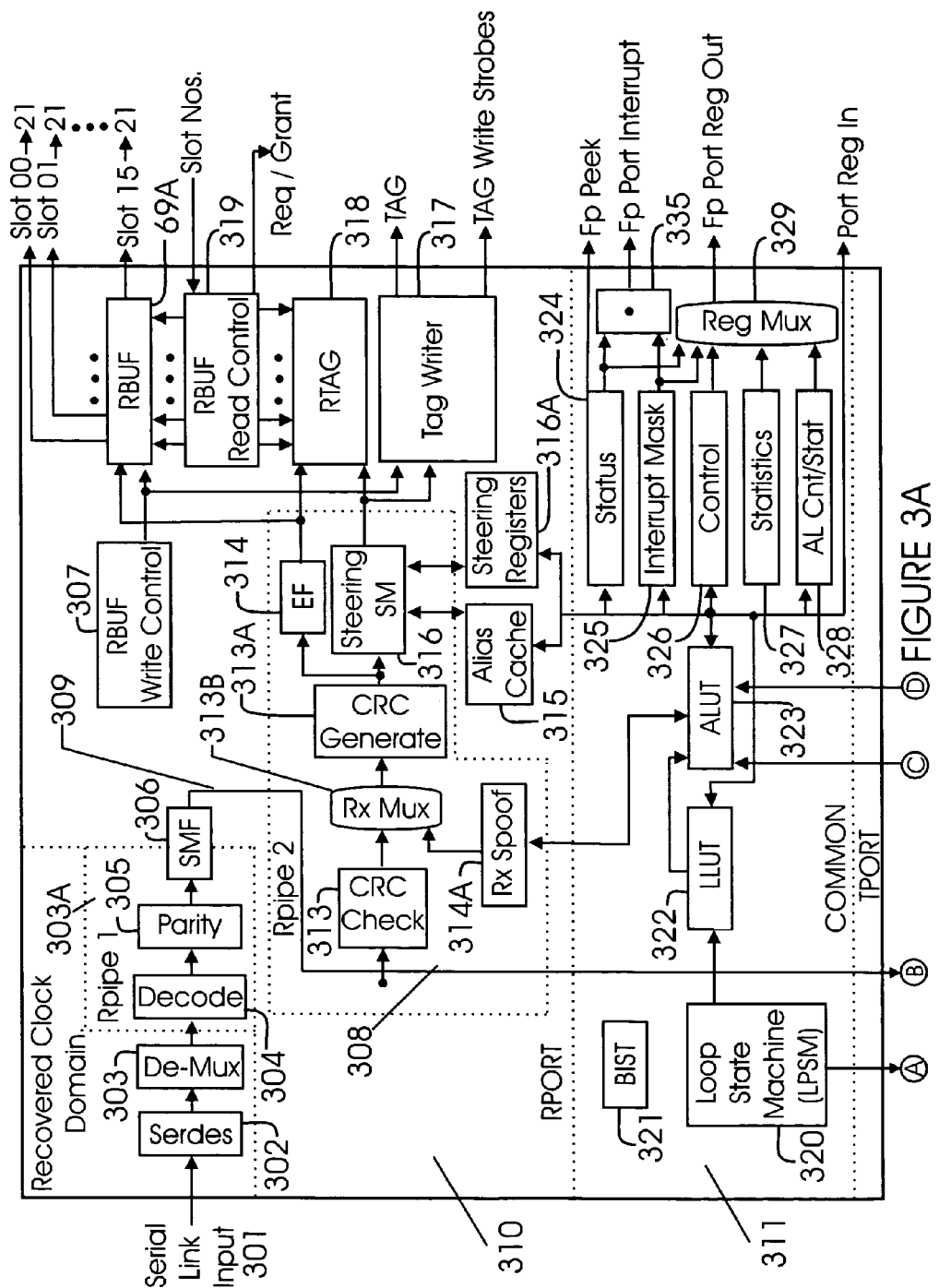
FIGS. 3A/3B (jointly referred to as FIG. 3) show a block diagram of a GL_Port, according to one aspect of the present invention.
Figure 3B:
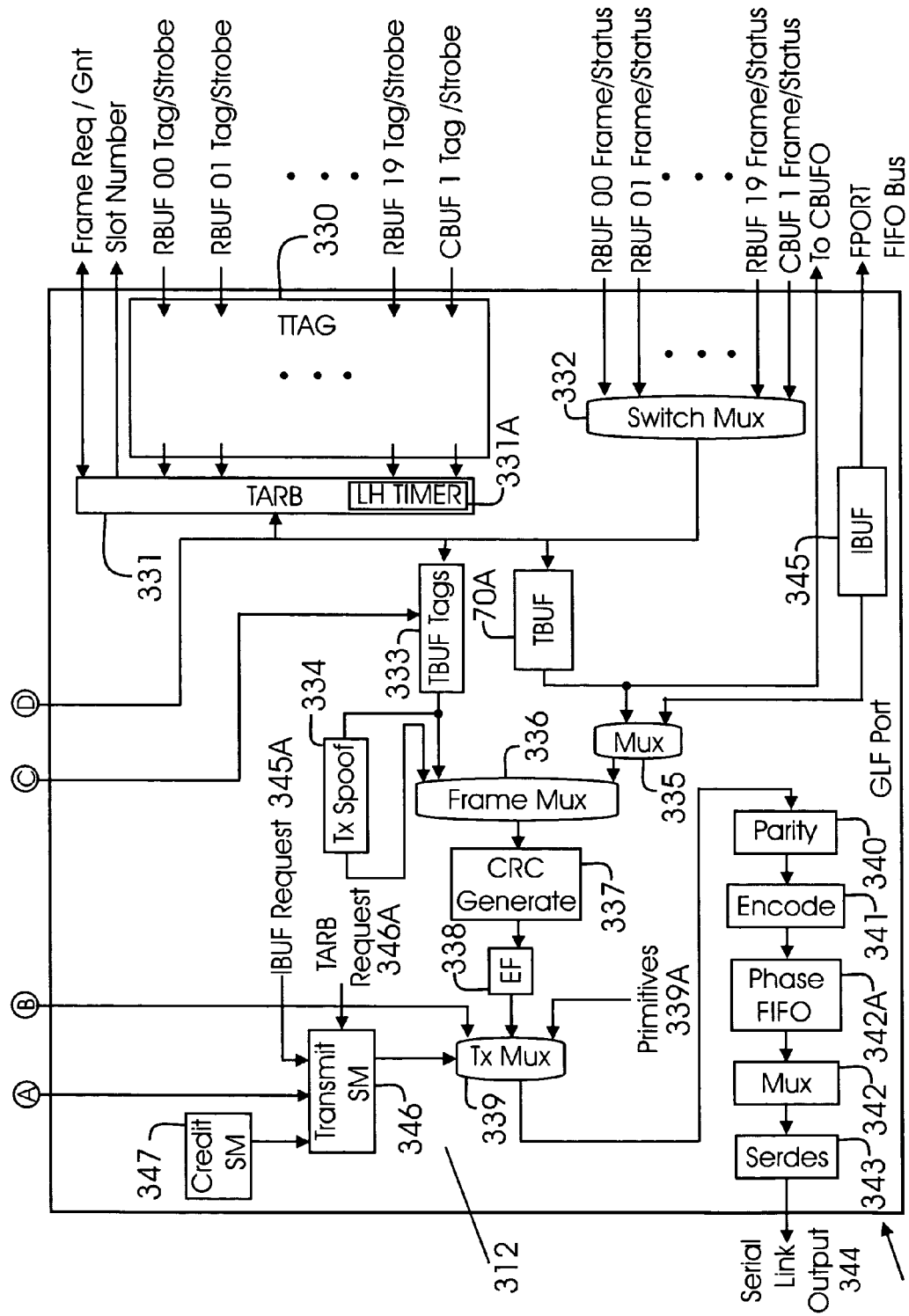

GL Port:

FIGS. 3A-3B (referred to as FIG.) show a detailed block diagram of a GL port as used in ASIC 20. GL port 300 (also referred to as GLF Port) is shown in three segments, namely, receive segment (RPORT) 310, transmit segment (TPORT) 31 and common segment 311.

Receive Segment of GL Port:

Frames enter through link 301 and SERDES 302 converts data into 10-bit parallel data to fibre channel characters, which are then sent to receive pipe ("Rpipe" may also be referenced as Rpipe 1 or Rpipe 2) 303A via a de-multiplexer (DEMUX) 303. Rpipe 303A includes, parity module 305 and decoder 304. Decoder 304 decodes 10B data to 8B and parity module 305 adds a parity bit. Rpipe 303A also performs various Fibre Channel standard functions such as detecting a start of frame (SOF), end-of frame (EOF), Idles, R_RDYs (fibre channel standard primitive) and the like, which are not described since they are standard functions.

Rpipe 303A connects to smoothing FIFO (SMF) module 306 that performs smoothing functions to accommodate clock frequency variations between remote transmitting and local receiving devices.

Frames received by RPORT 310 are stored in receive buffer (RBUF) 69A, (except for certain Fibre Channel Arbitrated Loop (AL) frames). Path 309 shows the frame entry path, and all frames entering path 309 are written to RBUF 69A as opposed to the AL path 308.

Cyclic redundancy code (CRC) module 313 further processes frames that enter GL port 300 by checking CRC and processing errors according to FC_PH rules. The frames are subsequently passed to RBUF 69A where they are steered to an appropriate output link. RBUF 69A is a link receive buffer and can hold multiple frames.

Reading from and writing to RBUF 69A are controlled by RBUF read control logic ("RRD") 319 and RBUF write control logic ("RWT") 307, respectively. RWT 307 specifies which empty RBUF 69A slot will be written into when a frame arrives through the data link via multiplexer ("Mux") 313B, CRC generate module 313A and in EF module 314. EF (external proprietary format) module 314 encodes proprietary (i.e. non-standard) format frames to standard Fibre Channel 8B codes. Mux 313B receives input from Rx Spoof module 314A, which encodes frames to a proprietary format (if enabled). RWT 307 controls RBUF 69A write addresses and provides the slot number to tag writer ("TWT") 317.

RRD 319 processes frame transfer requests from RBUF 69A. Frames may be read out in any order and multiple destinations may get copies of the frames.

Steering state machine (SSM or Steering SM) 16 receives frames and determines the destination for forwarding the frame. SSM 316 produces a destination mask, where there is one bit for each destination. Any bit set to a certain value for example, 1, specifies a legal destination, and there can be multiple bits set, if there are multiple destinations for the same frame (multicast or broadcast).

SSM 316 makes this determination using information from alias cache 315, steering registers 316A, control register 326 values and frame contents. IOP 66 writes all tables so that correct exit path is selected for the intended destination port addresses.

The destination mask from SSM 316 is sent to TWT 317 and a RBUF tag register (RTAG) 318. TWT 317 writes tags to all destinations specified in the destination mask from SSM 316. Each tag identifies its corresponding frame by containing an RBUF 69A slot number where the frame resides, and an indication that the tag is valid.

Each slot in RBUF 69A has an associated set of tags, which are used to control the availability of the slot. The primary tags are a copy of the destination mask generated by SSM 316. As each destination receives a copy of the frame, the destination mask in RTAG 318 is cleared. When all the mask bits are cleared, it indicates that all destinations have received a copy of the frame and that the corresponding frame slot in RBUF 69A is empty and available for a new frame.

RTAG 318 also has frame content information that is passed to a requesting destination to pre-condition the destination for the frame transfer. These tags are transferred to the destination via a read multiplexer (RMUX) (not shown).

Transmit Segment of GL Port:

Transmit segment ("TPORT") 312 performs various transmit functions. Transmit tag register (TTAG) 330 provides a list of all frames that are to be transmitted. Tag Writer 317 or common segment 311 write TTAG 330 information. The frames are provided to arbitration module ("transmit arbiter" ("TARB")) 331, which is then free to choose which source to process and which frame from that source to be processed next.

TTAG 330 includes a collection of buffers (for example, buffers based on a first-in first out ("FIFO") scheme) for each frame source. TTAG 330 writes a tag for a source and TARB 331 then reads the tag. For any given source, there are as many entries in TTAG 330 as there are credits in RBUF 69A.

TARB 331 is activated anytime there are one or more valid frame tags in TTAG 330. TARB 331 preconditions its controls for a frame and then waits for the frame to be written into TBUF 70A. After the transfer is complete, TARB 331 may request another frame from the same source or choose to service another source.

TBUF 70A is the path to the link transmitter. Typically, frames don't land in TBUF 70A in their entirety. Mostly, frames simply pass through TBUF 70A to reach output pins, if there is a clear path.

Switch Mux 332 is also provided to receive output from crossbar 50. Switch Mux 332 receives input from plural RBUFs (shown as RBUF 00 to RBUF 19), and input from CPORT 62A shown as CBUF 1 frame/status. TARB 331 determines the frame source that is selected and the selected source provides the appropriate slot number. The output from Switch Mux 332 is sent to ALUT 323 for S_ID spoofing and the result is fed into TBUF Tags 333.

TMUX (also referred to as "Tx Mux") 339 chooses which data path to connect to the transmitter. The sources are: primitive sequences specified by IOP 66 via control registers 326 (shown as primitive 339A), and signals as specified by Transmit state machine ("TSM") 346, frames following the loop path, or steered frames exiting the fabric via TBUF 70A.

TSM 346 chooses the data to be sent to the link transmitter, and enforces all fibre Channel rules for transmission. TSM 346 receives requests to transmit from loop state machine 320, TBUF 70A (shown as TARB request 346A) and from various other IOP 66 functions via control registers 326 (shown as IBUF Request 345A). TSM 346 also handles all credit management functions, so that Fibre Channel connectionless frames are transmitted only when there is link credit to do so.

Loop state machine ("LPSM") 320 controls transmit and receive functions when GL_Port is in a loop mode. LPSM 320 operates to support loop functions as specified by FC-AL-2.

IOP buffer ("IBUF") 345 provides IOP 66 the means for transmitting frames for special purposes.

Frame multiplexer ("Frame Mux" or may be referenced as "Mux") 336 chooses the frame source, while logic (TX spoof 334) converts D_ID and S_ID from public to private addresses. Frame Mux 336 receives input from Tx Spoof module 334, TBUF tags 333, and Mux 335 to select a frame source for transmission.

EF (external proprietary format) module 338 encodes proprietary (i.e. non-standard) format frames to standard Fibre Channel 8B codes and CRC module 337 generates CRC data for the outgoing frames.

Modules 340-343 put a selected transmission source into proper format for transmission on an output link 344. Parity 340 checks for parity errors, when frames are encoded from 8B to 10B by encoder 341, marking frames "invalid", according to Fibre Channel rules, if there was a parity error. Phase FIFO 342A receives frames from encode module 341 and the frame is selected by Mux 342 and passed to SERDES 343. SERDES 343 converts parallel transmission data to serial before passing the data to the link media. SERDES 343 may be internal or external to ASIC 20.

Common Segment of GL Port:

As discussed above, ASIC 20 include common segment 311 comprising of various modules. LPSM 320 has been described above and controls the general behavior of TPORT 312 and RPORT 310.

A loop look up table ("LLUT") 322 and an address look up table ("ALUT") 323 is used for private loop proxy addressing and hard zoning managed by firmware.

Common segment 311 also includes control register 326 that controls bits associated with a GL_Port, status register 324 that contains status bits that can be used to trigger interrupts, and interrupt mask register 325 that contains masks to determine the status bits that will generate an interrupt to IOP 66. Common segment 311 also includes AL control and status register 328 and statistics register 327 that provide accounting information for FC management information base ("MIB").

Output from status register 324 may be used to generate a Fp Peek function. This allows a status register 324 bit to be viewed and sent to the CPORT.

Output from control register 326, statistics register 327 and register 328 (as well as 328A for an X_Port, shown in FIG. 4) is sent to Mux 329 that generates an output signal (FP Port Reg Out).

Output from Interrupt register 325 and status register 324 is sent to logic 335 to generate a port interrupt signal (FP Port Interrupt).

BIST module 321 is used for conducting embedded memory testing.

XG Port

Figure 4A:
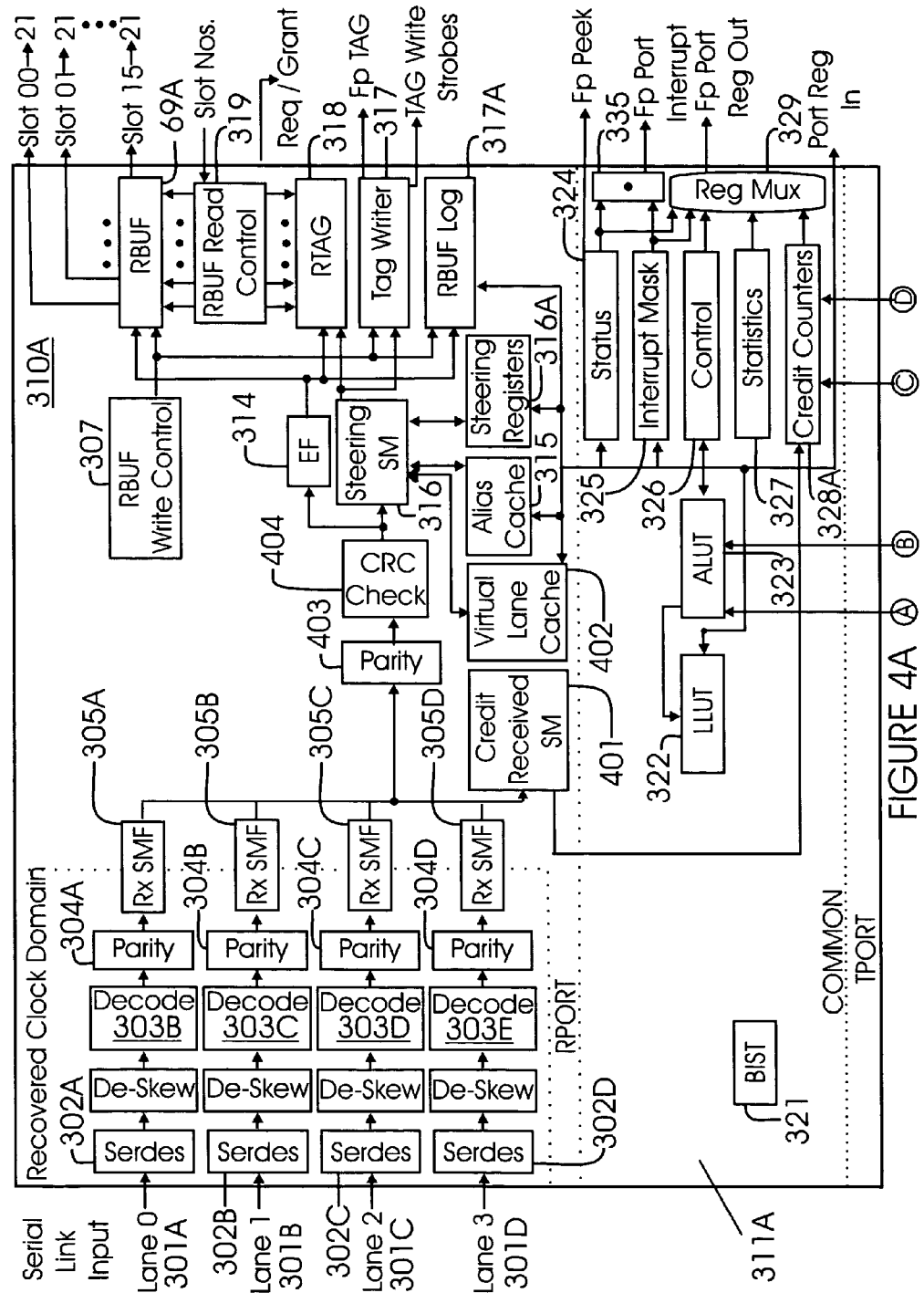
FIGS. 4A/4B (jointly referred to as FIG. 4) show a block diagram of XG_Port (10 G) port, according to one aspect of the present invention.
Figure 4B:
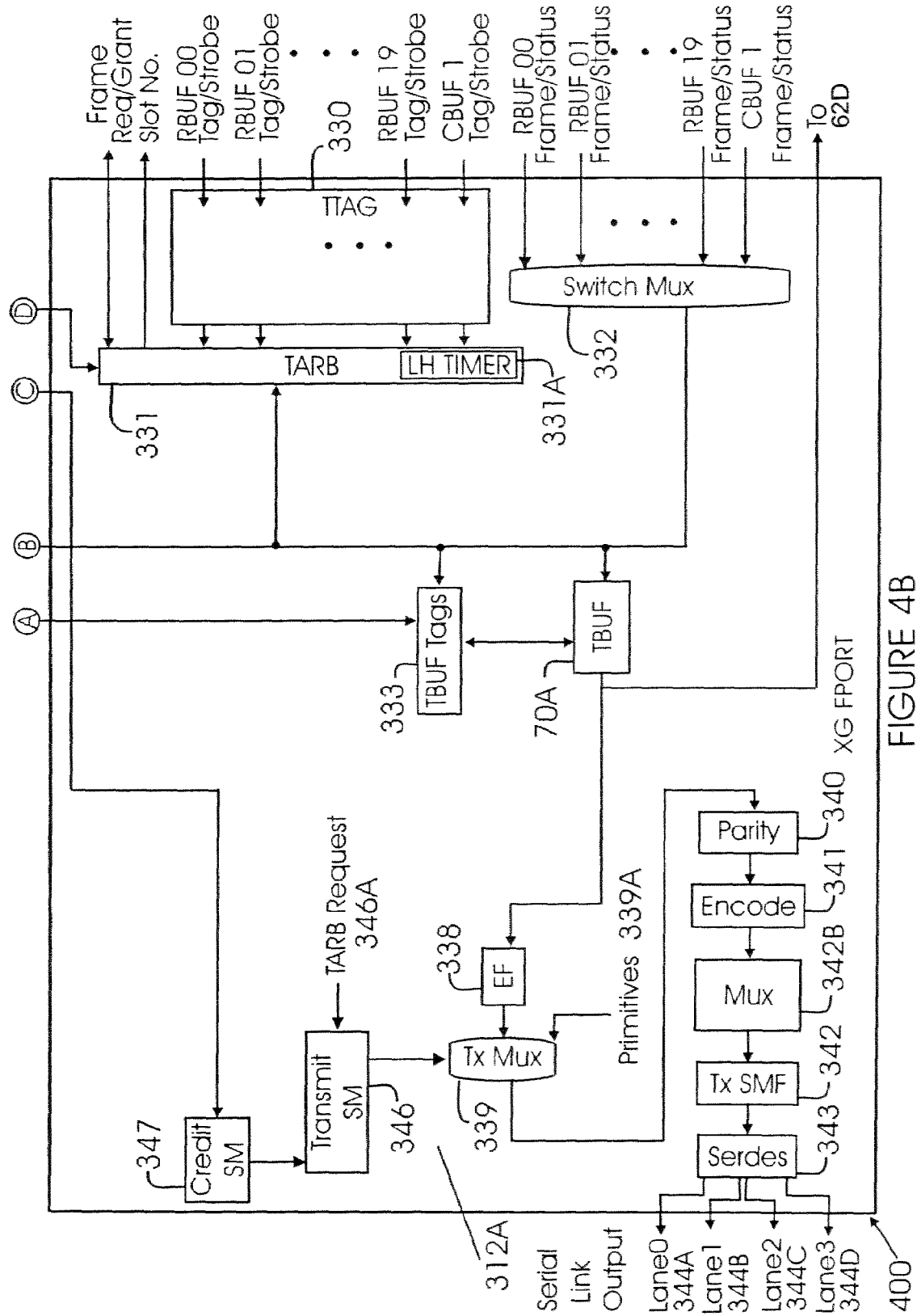

FIGS. 4A-4B (referred to as FIG. 4) show a block diagram of a 10 G Fibre Channel port control module (XG FPORT) 400 used in ASIC 20. Various components of XG FPORT 400 are similar to GL port control module 300 that are described above. For example, RPORT 310 and 310A, Common Port 311 and 311A, and TPORT 312 and 312A have common modules as shown in FIGS. 3 and 4 with similar functionality.

RPORT 310A can receive frames from links (or lanes) 301A-301D and transmit frames to lanes 344A-344D. Each link has a SERDES (302A-302D), a de-skew module, a decode module (303B-303E) and parity module (304A-304D). Each lane also has a smoothing FIFO (SMF) module 305A-305D that performs smoothing functions to accommodate clock frequency variations. Parity errors are checked by module 403, while CRC errors are checked by module 404.

RPORT 310A uses a virtual lane ("VL") cache 402 that stores plural vector values that are used for virtual lane assignment. In one aspect of the present invention, VL Cache 402 may have 32 entries and two vectors per entry. IOP 66 is able to read or write VL cache 402 entries during frame traffic. State machine 401 controls credit that is received. On the transmit side, credit state machine 347 controls frame transmission based on credit availability. State machine 347 interfaces with credit counters 328A.

Also on the transmit side, modules 340-343 are used for each lane 344A-344D, i.e., each lane can have its own module 340-343. Parity module 340 checks for parity errors and encode module 341 encodes 8-bit data to 10 bit data. Mux 342B sends the 10-bit data to a SMF module ("Tx SMF") 342 that handles clock variation on the transmit side. SERDES 343 then sends the data out to the link.

Programmable Data Dependent Network Routing:

In one aspect of the present invention, a versatile routing technique/system is provided that allows selection of plural routes to a destination. The routes can be selected based on fields in the fibre channel frame header. The choice of routes can be used for load balancing or for setting up preferred routes, as described below.

Figures 1, 1E, 2:
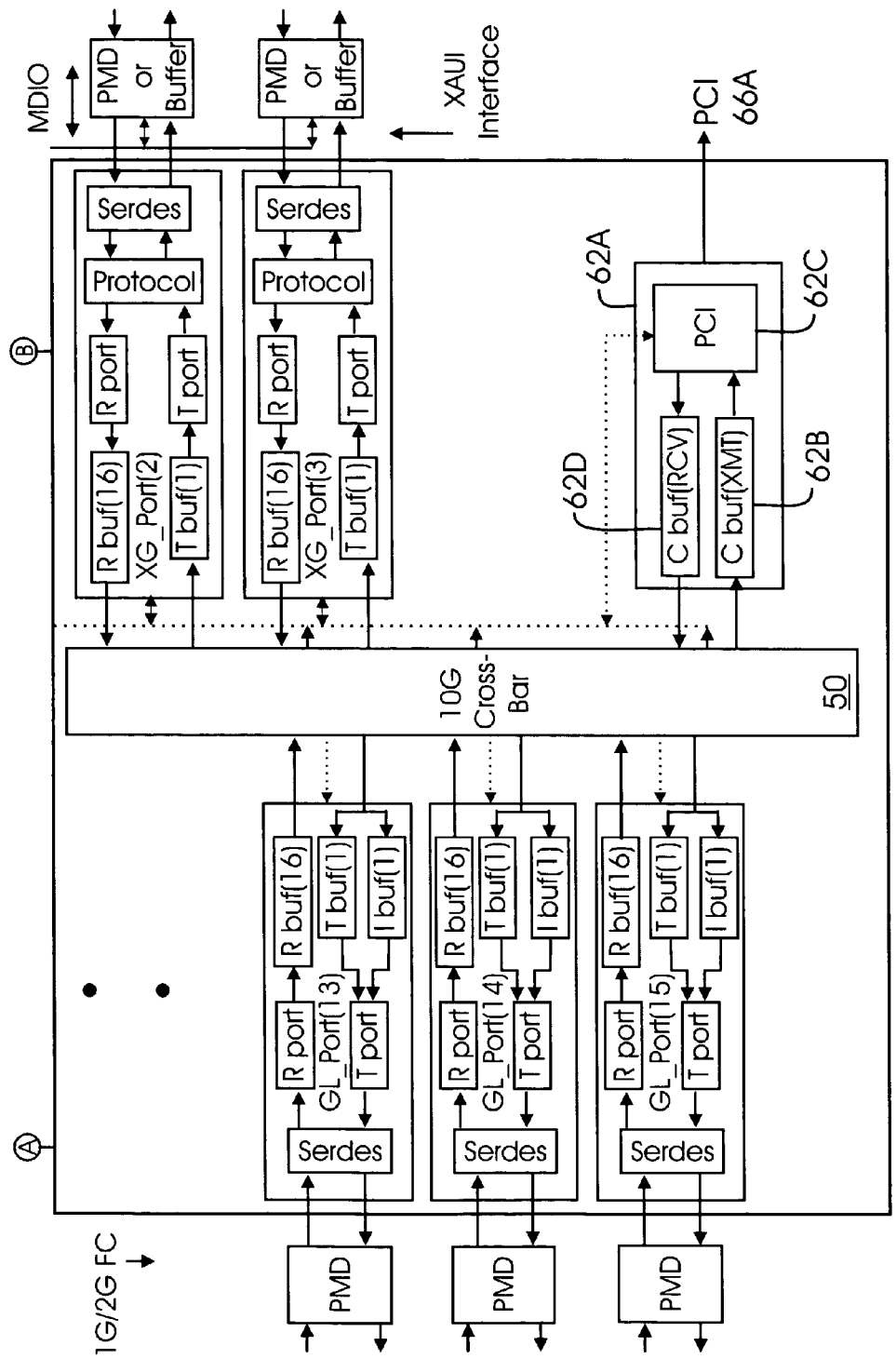
FIG. 2 shows a block diagram of a look up table used for routing frames, according to one aspect of the present invention.
Figure 2:
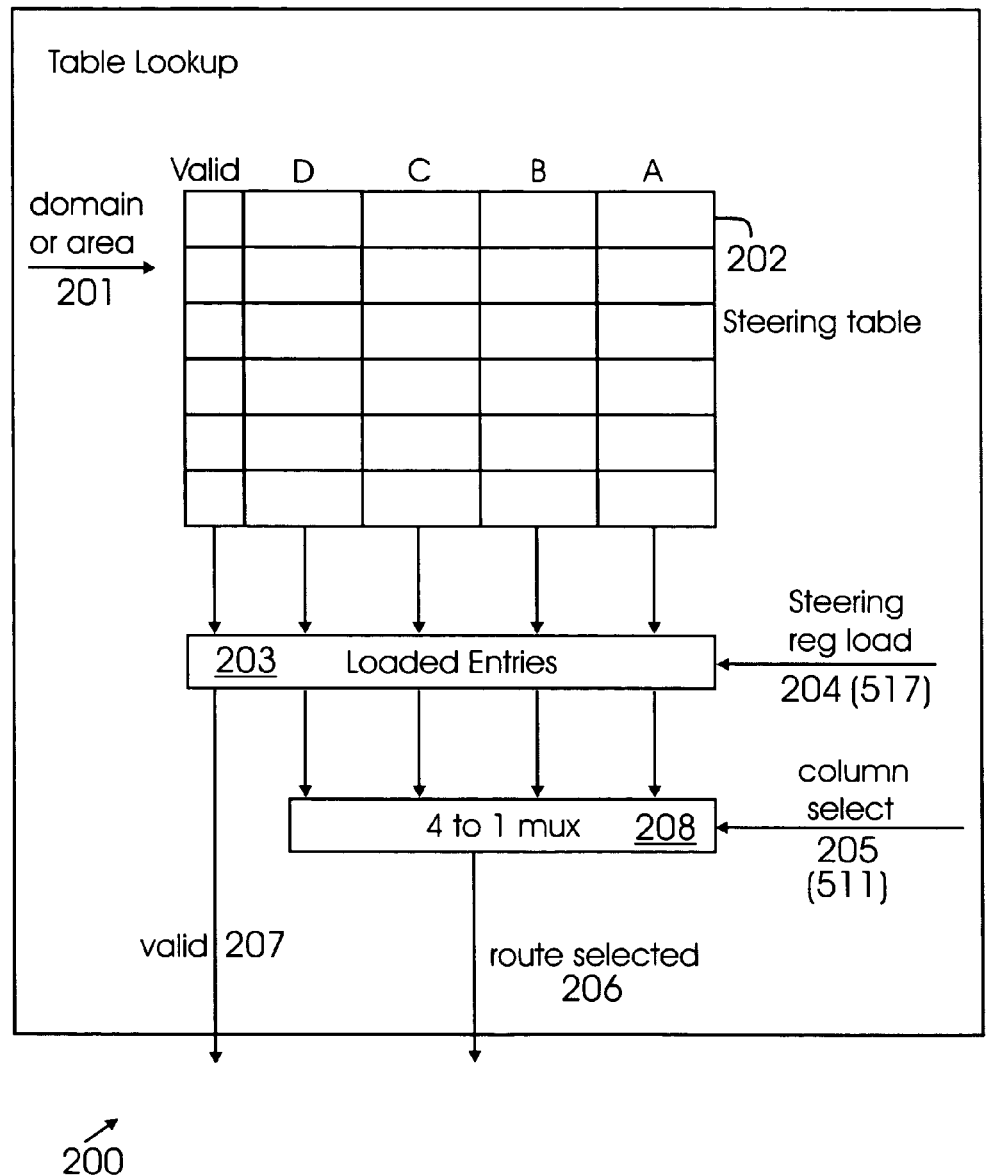

In one aspect of the present invention, a "column" steering system is used for routing frames. FIG. 2 shows a block diagram of system 200 that is used to route frames, according to one aspect of the present invention.

System 200 includes a steering table (or a look up table ("LUT")) 202 (similar to LUT 322) that receives Domain bits (16-23 bits) or Area bits (8-21) bits of the D_ID values 201. Domain bits are used to steer frames to a different switch, while Area bits are used to steer within a local switch. It is noteworthy that values 201 may also include virtual storage area network numbers ("VSAN #"), ALPA values, or any other parameter.

When a frame is received, Domain/Area/VSAN and/or ALPA numbers are used to index LUT 202. These values are loaded into register 203. This is performed by firmware. Steering register load signal 204 (same as 517 of FIG. 5) commands a table look up based on the frames that are passing through.

As shown in FIG. 2, columns A-D provide four different routing options. Column select signal (or value) 205 (same as 511 from FIG. 5) is used to select one of the destination routes. The column select value 205 determines which particular column (i.e. A-D) is selected for routing frames. A route 206 is selected based on the column via multiplexer 208. Register 203 also generates a valid signal 207.

Figure 5:
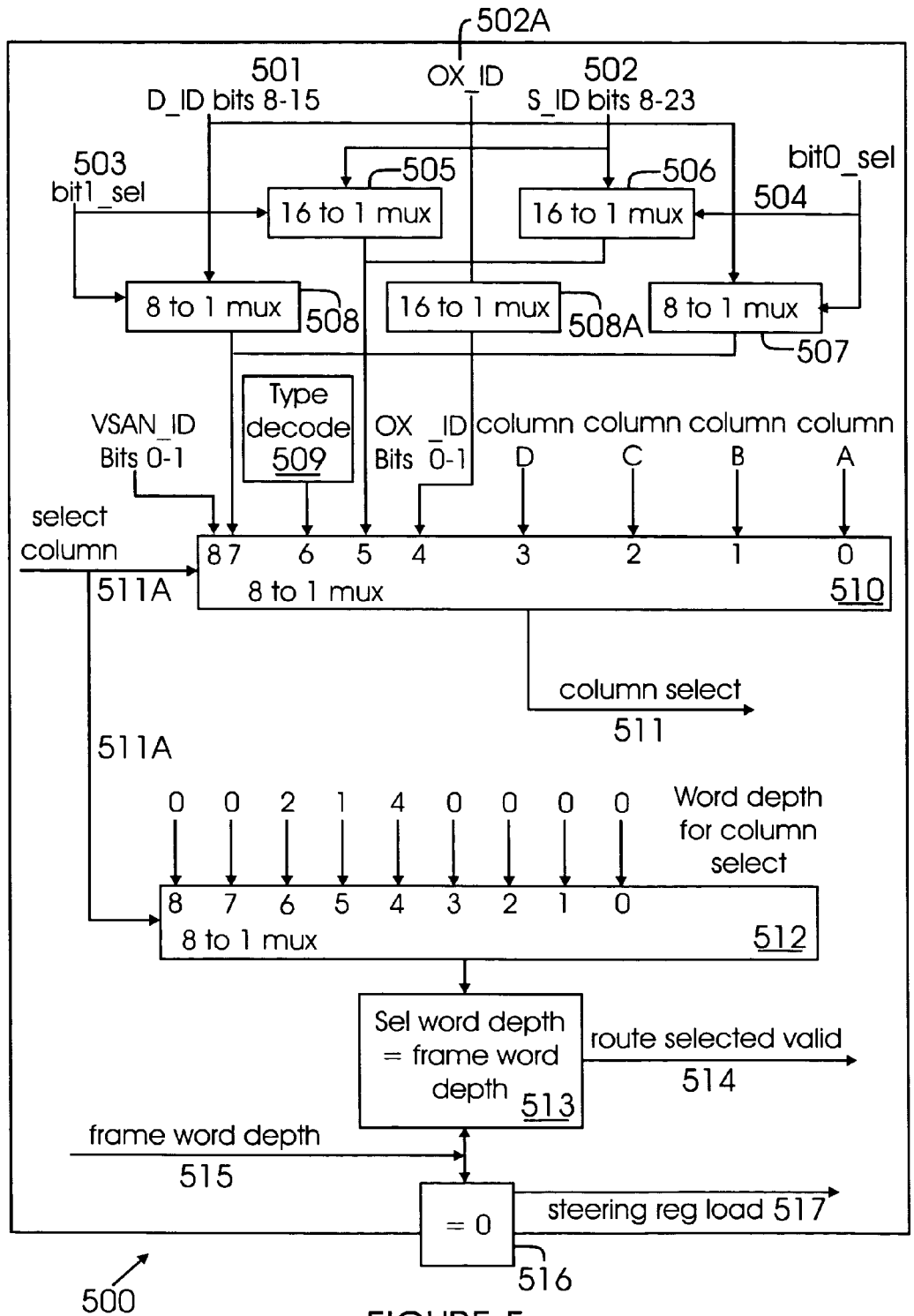
FIG. 5 shows a system for routing frames, according to one aspect of the present invention.

FIG. 5 shows a block diagram of a system 500 that shows how the column select value 511 is determined. D_ID bits 501 and S_ID bits 502 are sent to multiplexer (MUX) 510, via Mux 508 and 506, respectively. Ox_ID 502A is also sent to Mux 510 via Mux 508A. Mux 510, as shown in FIG. 5, has 8 bits used to output column select signal 511. It is noteworthy that the present invention is not limited to any particular type or size of Mux 510 or the type of logic. The following provides a description of the 8 bits used in Mux 510 to generate column select signal 511:

0—Always use column A

1—Always use column B

2—Always use column C

3—Always use column D

4—Use bits from the Fibre Channel header OX_ID field (502A) to select the column. The bits from the OX_ID are selected by bit0_sel 504 (via Mux 505 and 508) and bit1_sel 503 (via Mux 506 and 507) values.

5—Use bits from the Fibre Channel header S_ID field to select the column. The bits from the S_ID are selected by bit0_sel 503 and bit1_sel 504 values.

6—Decode the Fibre Channel header Type field (509) to select the column. The values used are:

5—(Internet Protocol) use column A

8—(SCSI FCP) use column B

88—(hex 0x58,Virtual Interface) use column C All others—use column D

7—Use bits from the Fibre Channel header D_ID field to select the column. The bits from D_ID are selected by bit0_sel 503 and bit1_sel 504 values.

Another bit value that may be used is for VSAN_ID (virtual storage area identifier) (shown as bit 8 in FIG. 5) to route the frame.

Bit1_sel 503 and bit0_sel 504 values are programmable by firmware and are used to select D_ID or S_ID bits if bit values 5 or 7 are used for the column select value 511.

Select column value (or signal/command) 511A is received from control register 326. This value is again programmable and is used to set the column select value 511 based on which a particular column value is used to route frames.

For domain steering, the domain part of the D_ID is not used for column select bits since that part of the address is already used to address the steering table 202. For area steering, D_ID is not needed for column select values because the domain is always the local switch domain, and area is used to look up steering table 202.

Select column signal 511A is also sent to Mux 512 that maps the 8 bits of Mux 510 to actual frame depth. For example, if OX_ID (bit 4, from Mux 510) is used for routing, then the fourth word in the frame header must be read. If D_ID is used, then the $0^{th}$ word must be read.

Based on the column select value 511, the selected word depth and the frame depth are matched by logic 513. If the match is correct, a valid route 514 is selected and sent to SSM 316.

Frame word depth 515 for every frame is sent to logic 513 and logic 516. When the $0^{th}$ word of a frame is read, steering register load signal 517 (same as FIG. 2, signal 204) is generated that commands table look up, discussed above.

Figure 6:
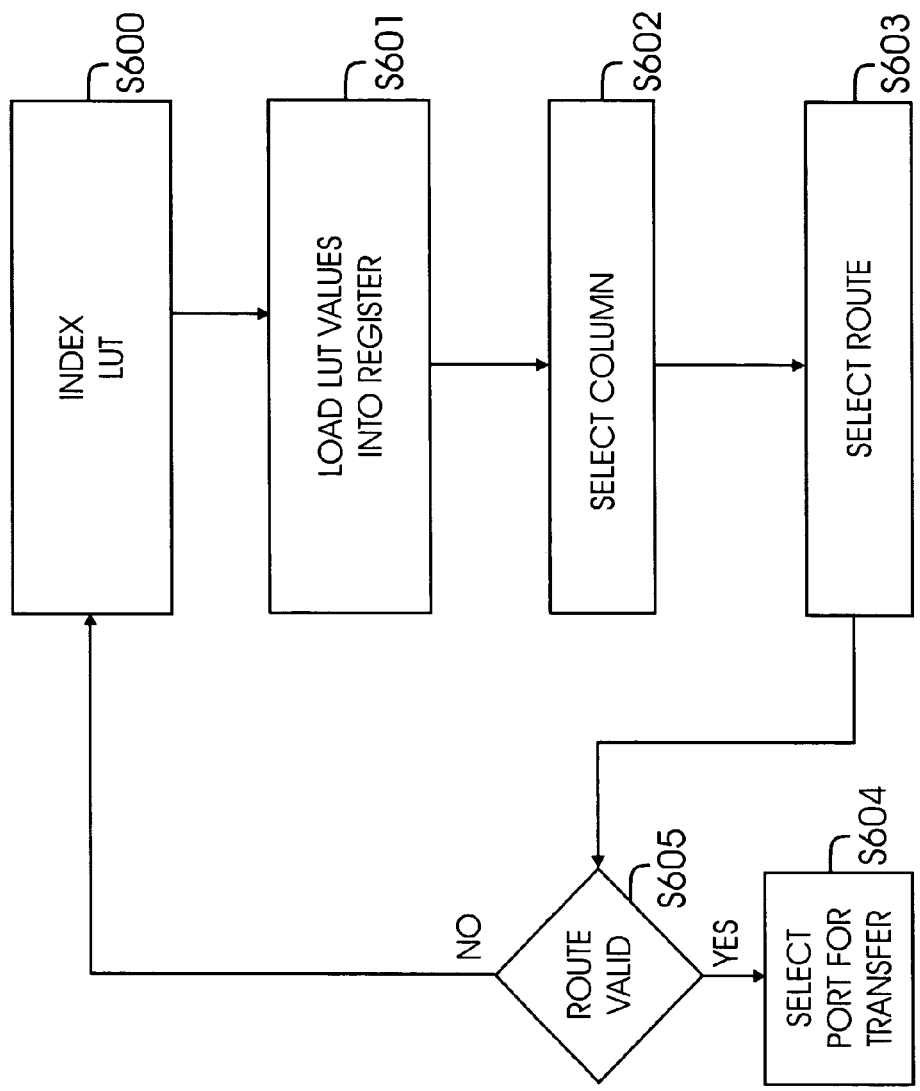
FIG. 6 shows a flow diagram of executable steps for routing frame, according to one aspect of the present invention.

FIG. 6 is a flow diagram of process steps, for routing frames, according to one aspect of the present invention.

In step S600, table 202 is indexed. Domain/Area/VSAN and/or ALPA numbers are used to index LUT 202.

In step S601, the indexed table values are loaded into register 203.

In step S602, a particular column is selected for routing. The column selection is based on select column signal 511. One of the 8 bits shown in MUX 510 can be used for routing frames.

In step S603, based on the column, a route is selected.

In step S604, the process determines if the route is valid. This can be performed by logic 513, which makes sure that the correct word depth matches the frame word depth.

If the route is not valid, the process goes back to step S600.

If the route is valid, then in step S605, a port is selected for transfer.

The following provides examples of how the present invention can be used for load balancing and/or preferred routing:

Example 1

Figure 7A:
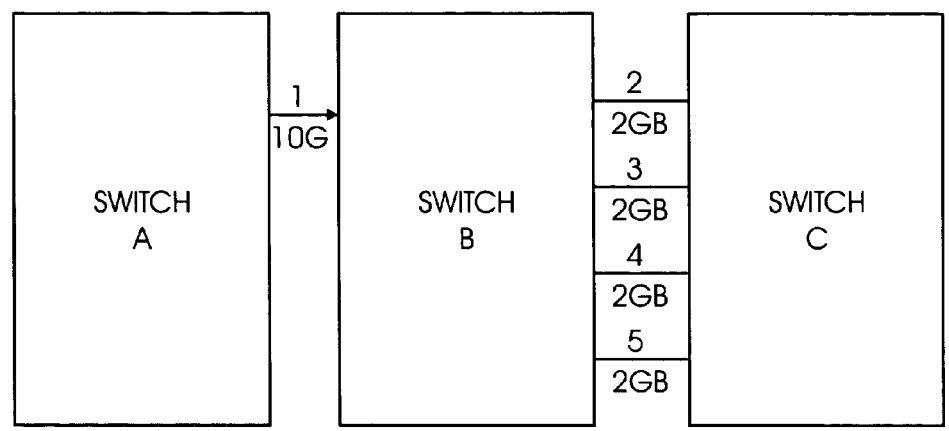
FIGS. 7A and 7B show examples of applying the routing techniques, according to one aspect of the present invention.

FIG. 7A shows that link 1 between switch A and B is a high-speed 10 Gigabit link. Links 2, 3, 4, and 5 are 2 Gigabit links. If all the traffic from switch A to switch C is through one of the 2 Gigabit links (i.e. links 2, 3, 4 or 5) then the 10 Gigabit link would not be able to send data faster than 2 Gigabits and hence cause congestion.

Using the column steering methodology described above, the receive port for link 1 on switch B will allow traffic destined for switch C to be routed through all 4 of the slower links to get better performance. S_ID, D_ID, OX_ID, VSAN# or any other parameter may be used for the selecting the appropriate column.

Example 2

Figure 7B:
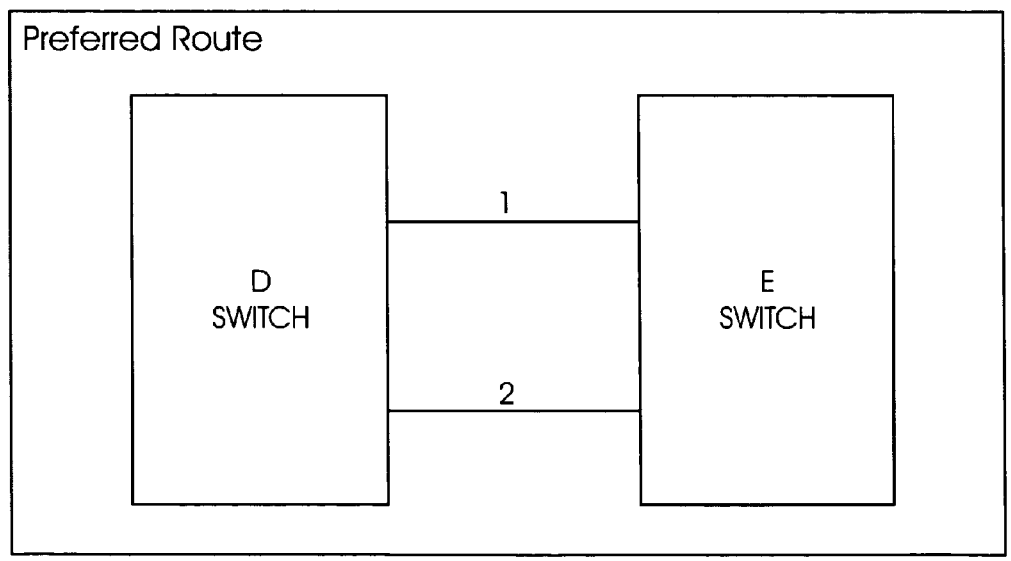

As shown in FIG. 7B, switches D and F are coupled via links 1 and 2. If ports on switch D want to send higher priority data to switch B, the lower 2 bits of the OX_ID may be reserved for the higher priority traffic. The higher priority traffic could use link 2, while all other traffic from D to F use link 1.

If the bits 0-1 of the OX_ID for high priority traffic are set to binary '11', the select column and steering tables for each port on switch D would be set as follows:

Select column=4 (bits 0-1 of OX_ID)

Steering table for Domain of switch E=

Column A=link 1

Column B=link 1

Column C=link 1

Column D=link 2

Although the present invention has been described with reference to specific embodiments, these embodiments are illustrative only and not limiting. Many other applications and embodiments of the present invention will be apparent in light of this disclosure and the following claims.

What is claimed is:

1. A method for routing fibre channel frames using a fibre channel switch element, comprising the steps of:
    (a) receiving a fibre channel frame at a port of the fibre channel switch element having a plurality of ports;
    (b) indexing a look up table by using (i) a Domain value for routing the fibre channel frame to another fibre channel switch, (ii) an Area value for routing the fibre channel frame within the fibre channel switch that received the fibre channel frame, (iii) a Virtual Storage Area Network identifier (VSAN#) for routing the fibre channel frame within a Virtual Storage Area Network, and (iv) an Arbitrated Loop Physical Address (AL_PA) value included in a header of the fibre channel frame; wherein the look up table includes a plurality of columns for storing destination information indexed by the Domain value, the Area value, the Virtual Storage Network identifier and the Arbitrated Loop Physical Address;
    (c) selecting a look up table value from one of the plurality of columns of the look up table, for routing a fibre channel frame based on a column select signal generated by a hardware logic of the fibre channel switch element; and
    (d) routing the frame if a route based on the selected table value is valid.

2. The method of claim 1, wherein a frame's destination identifier field (D_ID) is used to select a column for frame routing information.

3. The method of claim 1, wherein a valid route is determined by matching a correct word depth with frame word depth.

4. The method of claim 1, wherein a frame's originator exchange identification field OX_ID) is used to select a column for frame routing information.

5. The method of claim 1, wherein a frame's source identifier field (S_ID) value is used to select a column for frame routing information.

6. The method of claim 1, wherein a frame's TYPE field is used to select a column for frame routing information.

7. The method of claim 1, wherein bits other than a TYPE field of a frame are used to select a column for frame routing information.

8. The method of claim 1, wherein the column select signal generated after a plurality of fields are input to the hardware logic and one of the input is selected to generate the column select signal.

9. The method of claim 8, wherein the hardware logic is a multiplexer and the plurality of inputs are a destination identifier field (D_ID), a source identifier field (S_ID), a virtual storage area network identifier, an originate exchange identification field (OX_ID), a TYPE field, and a decode fibre channel header type field.

10. A fibre channel switch element configured to select a route from amongst a plurality of routes for routing fibre channel frames, the fibre channel switch element comprising:
- at least one port for receiving and transmitting a fibre channel frame;
- a look up table with a plurality of columns that is indexed by (i) a Domain value for routing the fibre channel frame to another fibre channel switch, (ii) an Area value for routing the fibre channel frame within the fibre channel switch that received the fibre channel frame, (iii) a Virtual Storage Area Network identifier (VSAN#) for routing the fibre channel frame within a Virtual Storage Area Network, and (iv) an Arbitrated Loop Physical Address (AL_PA) value; and
- a hardware logic that receives a plurality of inputs and based on one of the inputs generates a column select signal, wherein the column select signal is used to select a column from the one of the plurality of columns of the look up table to route fibre channel frames, if the route based on the selected column is valid.

11. The switch element of claim 10, further comprising:
hardware logic module for validating a frame route by performing word depth match.

12. The switch element of claim 10, wherein in a register is used to load look up table entries and column entries are selected based on the column select signal.

13. The switch element of claim 10 wherein a frame's originator exchange identification field (OX_ID) is used to select a column for frame routing information.

14. The switch element of claim 10, wherein a frame's destination identifier (D_ID) is used to select a column for frame routing information.

15. The switch element of claim 10, wherein a frame's TYPE field is used to select a column for frame routing information.

16. The switch of claim 10, wherein bits other than a TYPE field of a frame are used to select a column for frame routing information.

17. The switch element of claim 10, wherein a frame's source identifier (S_ID) value is used to select a column for frame routing information.

18. A network system, comprising:
- a host computing system for sending and receiving information;
- at least one storage system for storing information; and
- at least one fibre channel switch element configured to select a route from amongst a plurality of routes, for routing fibre channel frames in the network, the fibre channel switch element includes:
- at least one port for receiving and transmitting a fibre channel frame;
- a look up table with a plurality of columns that is indexed by (i) a Domain value for routing the fibre channel frame to a other fibre channel switch, (ii) an Area value for routing the fibre channel frame within the fibre channel switch that received the fibre channel frame, (iii) a Virtual Storage Area Network identifier (VSAN#) for routing the fibre channel frame within a Virtual Storage Area Network, and (iv) an Arbitrated Loop Physical Address (AL_PA) value; and
- a hardware logic that receives a plurality of inputs and based on one of the inputs generates a column select signal, wherein the column select signal is used to select a column from the one of the plurality of columns of the look up table to route fibre channel frames, if a route based on the selected column is valid.

19. The system of claim 18, wherein the hardware logic is a multiplexer and the plurality of inputs are a destination identifier field (D_ID), a source identifier field (S_ID), a virtual storage area network identifier, an originator exchange identification field (OX_ID), a TYPE field, and a decode fibre channel header type field.

20. The system of claim 18, wherein a register is used to load look up table entries and column entries are selected based on the column select signal.

* * * * *

UNITED STATES PATENT AND TRADEMARK OFFICE
CERTIFICATE OF CORRECTION

PATENT NO. : 7,573,909 B2  Page 1 of 1
APPLICATION NO. : 10/894627
DATED : August 11, 2009
INVENTOR(S) : Frank R Dropps et al.

It is certified that error appears in the above-identified patent and that said Letters Patent is hereby corrected as shown below:

In column 5, line 9, delete "Circuit"" and insert -- Circuit") --, therefor.

In column 5, line 13, delete "(connectionless." and insert -- (connectionless, --, therefor.

In column 5, line 27, delete "for example F_Port." and insert -- for example, F_Port, --, therefor.

In column 5, line 60, delete "6" and insert -- 62 --, therefor.

In column 6, line 47, delete "FIG.)" and insert -- FIG.3) --, therefor.

In column 6, line 51, delete "31" and insert -- 312 --, therefor.

In column 7, line 27, delete "16" and insert -- 316 --, therefor.

In column 7, line 30, delete "value" and insert -- value, --, therefor.

In column 12, line 44, in claim 3, after "with" insert -- a --.

In column 12, line 48, in claim 4, delete "OX_ID)" and insert -- (OX_ID) --, therefor.

Signed and Sealed this

Second Day of November, 2010

David J. Kappos
*Director of the United States Patent and Trademark Office*